(12) United States Patent
Huang et al.

(10) Patent No.: US 12,119,912 B2
(45) Date of Patent: Oct. 15, 2024

(54) CONFIGURATION OF ACTIVE GROUPS OF ANTENNA PORTS

(71) Applicant: QUALCOMM Incorporated, San Diego, CA (US)

(72) Inventors: Yi Huang, San Diego, CA (US); Yu Zhang, San Diego, CA (US); Runxin Wang, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/727,506

(22) Filed: Apr. 22, 2022

(65) Prior Publication Data

US 2023/0344498 A1    Oct. 26, 2023

(51) Int. Cl.
*H04L 5/12* (2006.01)
*H04B 7/06* (2006.01)

(52) U.S. Cl.
CPC ......... *H04B 7/0691* (2013.01); *H04B 7/0608* (2013.01); *H04B 7/0634* (2013.01)

(58) Field of Classification Search
CPC ... H04B 7/0691; H04B 7/0608; H04B 7/0634
USPC ................ 375/262, 260, 259, 219, 295, 316
See application file for complete search history.

(56) References Cited

U.S. PATENT DOCUMENTS

2019/0372732 A1* 12/2019 Faxér ................... H04B 7/0691
2021/0211177 A1*  7/2021 Liu ....................... H04B 7/0628
2021/0281448 A1   9/2021 Li et al.
2023/0403061 A1* 12/2023 Qiang ............... H04L 25/03942

OTHER PUBLICATIONS

International Search Report and Written Opinion—PCT/US2023/016606—ISA/EPO—Jun. 26, 2023.

* cited by examiner

*Primary Examiner* — Zewdu A Kassa
(74) *Attorney, Agent, or Firm* — Arun Swain

(57) ABSTRACT

Aspects relate to configuring active groups of antenna ports. An apparatus may support different groups of antenna ports. One or more of these groups may be designated as active (e.g., for a scheduled transmission). In some examples, a first apparatus may send to a second apparatus an indication of the active groups. The second apparatus may then use the active groups for a transmission.

25 Claims, 16 Drawing Sheets

| | Group 0 | Group 1 | Group 2 | | | | |
|---|---|---|---|---|---|---|---|
| 902 → Active group indicator = | [0 | 0 | 1] | TPMI index = | [Null | Null | TPMI 2] |
| 904 → Active group indicator = | [0 | 1 | 0] | TPMI index = | [Null | TPMI 1 | Null ] |
| Active group indicator = | [0 | 1 | 1] | TPMI index = | [Null | TPMI 1 | TPMI 2] |
| Active group indicator = | [1 | 0 | 0] | TPMI index = | [TPMI 0 | Null | Null ] |
| Active group indicator = | [1 | 0 | 1] | TPMI index = | [TPMI 0 | Null | TPMI 2] |
| . . . | | | | . . . | | | |
| 906 → Active group indicator = | [1 | 1 | 1] | TPMI index = | [TPMI 0 | TPMI 1 | TPMI 2] |

| | Group 0 | Group 1 | Group 2 | | |
|---|---|---|---|---|---|
| 1102 → Active group indicator = | [0 | 0 | 1] | TPMI index = | [TPMI] |
| 1104 → Active group indicator = | [0 | 1 | 0] | TPMI index = | [TPMI] |
| Active group indicator = | [0 | 1 | 1] | TPMI index = | [TPMI] |
| Active group indicator = | [1 | 0 | 0] | TPMI index = | [TPMI] |
| Active group indicator = | [1 | 0 | 1] | TPMI index = | [TPMI] |
| . . . | | | | . . . | |
| 1106 → Active group indicator = | [1 | 1 | 1] | TPMI index = | [TPMI] |

FIG. 11

CONFIGURATION OF ACTIVE GROUPS OF ANTENNA PORTS

TECHNICAL FIELD

The technology discussed below relates generally to wireless communication and, more particularly, to configuring active groups of antenna ports.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple wireless communication devices. For example, a base station may allocate different resources (e.g., time domain and frequency domain resources) for different wireless communication devices operating within a cell of the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, an apparatus may include an interface and a processing system. The processing system may be configured to obtain, via the interface, a first indication of at least one active group of a plurality of groups of antenna ports. The processing system may also be configured to output, via the interface for transmission, signals associated with at least one antenna port of the at least one active group.

In some examples, a method for communication at an apparatus is disclosed. The method may include obtaining a first indication of at least one active group of a plurality of groups of antenna ports. The method may also include outputting, for transmission, signals associated with at least one antenna port of the at least one active group.

In some examples, an apparatus may include means for obtaining a first indication of at least one active group of a plurality of groups of antenna ports. The apparatus may also include means for outputting, for transmission, signals associated with at least one antenna port of the at least one active group.

In some examples, a non-transitory computer-readable medium has stored therein instructions executable by a processing system of an apparatus to obtain a first indication of at least one active group of a plurality of groups of antenna ports. The computer-readable medium may also have stored therein instructions executable by the processing system of the apparatus to output, for transmission, signals associated with at least one antenna port of the at least one active group.

In some examples, a first apparatus may include an interface and a processing system. The processing system may be configured to output, via the interface for transmission to a second apparatus, a first indication of at least one active group of a plurality of groups of antenna ports. The processing system may also be configured to obtain, via the interface, signals from the second apparatus that are associated with at least one antenna port of the at least one active group.

In some examples, a method for communication at a first apparatus is disclosed. The method may include outputting, for transmission to a second apparatus, a first indication of at least one active group of a plurality of groups of antenna ports. The method may also include obtaining signals from the second apparatus that are associated with at least one antenna port of the at least one active group.

In some examples, a first apparatus may include means for outputting, for transmission to a second apparatus, a first indication of at least one active group of a plurality of groups of antenna ports. The first apparatus may also include means for obtaining signals from the second apparatus that are associated with at least one antenna port of the at least one active group.

In some examples, a non-transitory computer-readable medium has stored therein instructions executable by a processing system of a first apparatus to output, for transmission to a second apparatus, a first indication of at least one active group of a plurality of groups of antenna ports. The computer-readable medium may also have stored therein instructions executable by the processing system of the first apparatus to obtain signals from the second apparatus that are associated with at least one antenna port of the at least one active group.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 9 is a conceptual illustration of an example of active group indicators and associated TPMIs according to some aspects.

FIG. 11 is a conceptual illustration of an example of active group indicators that are associated with a single TPMI according to some aspects.

DETAILED DESCRIPTION

Figure 1:
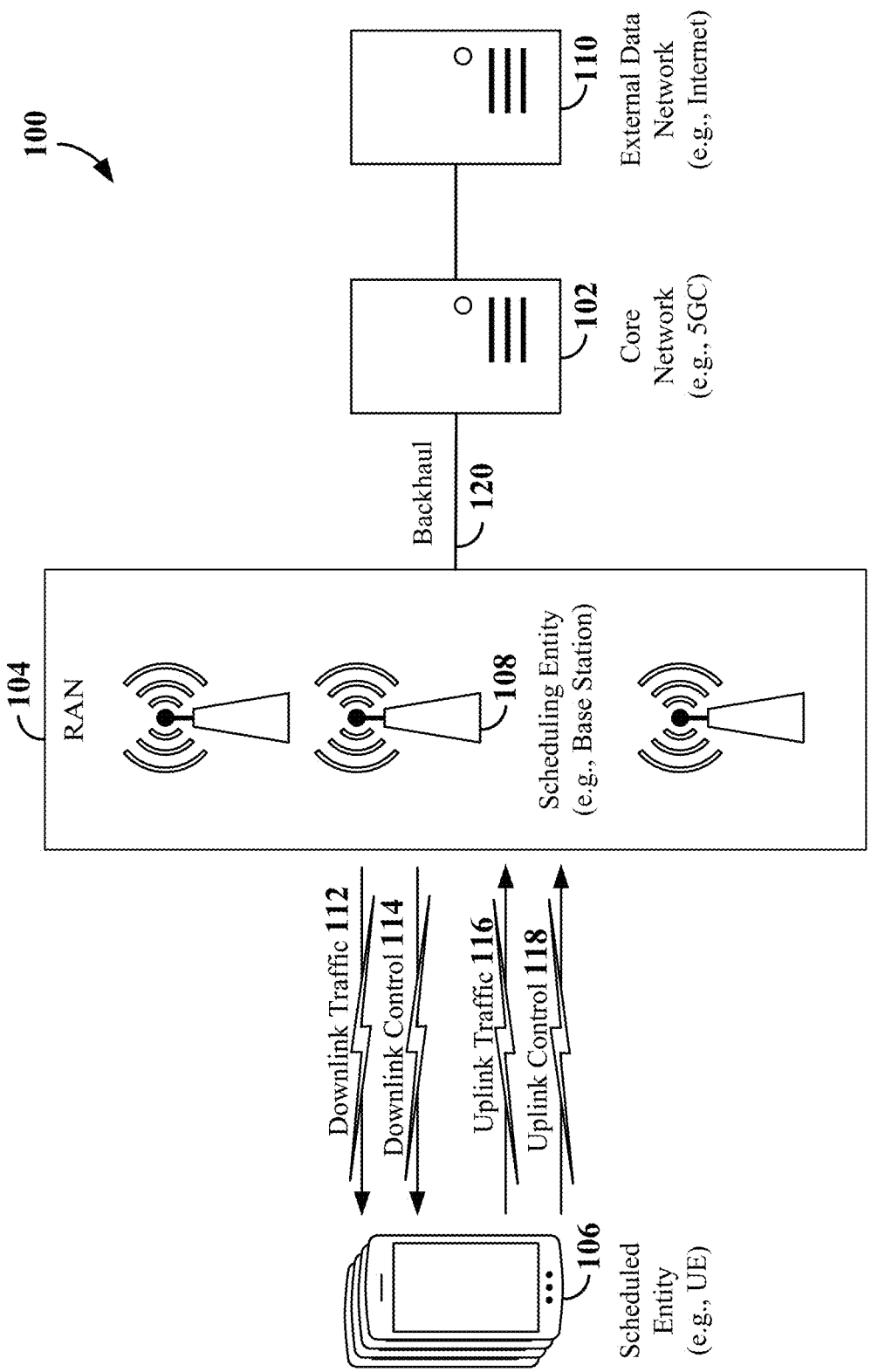
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to configuring active groups of antenna ports. An apparatus may support different groups of antenna ports. For example, an apparatus such as a UE may support up to eight antenna ports. In addition, the apparatus may support different groups of antenna ports. For example, a first group may include a first antenna port and a second antenna port, a second group may include a third antenna port and a fourth antenna port, and a third group may include a fifth antenna port, a sixth antenna port, a seventh antenna port, and an eighth antenna port. Other antenna port configurations may be used in other examples.

One or more of these groups of antenna ports may be designated as active (e.g., for a scheduled transmission). For example, a first apparatus (e.g., a base station) may send to a second apparatus (e.g., a UE) an indication of the active groups that the UE may use for a scheduled transmission. The second apparatus may then use the designated active groups for the transmission.

In some examples, the first apparatus may also send to the second apparatus an indication of at least one transmit precoding matrix indicator (TPMI) that is associated with a given active group. For example, a first TPMI may be indicated for a first active group and a second TPMI may be indicated for a second active group. As another example, a single TPMI may be indicated for two or more active groups. A transmit precoding matrix indicator may also be referred to as a transmitted precoding matrix indicator.

In some examples, the second apparatus may send to the first apparatus an indication of the groups of antenna ports that are supported by the second apparatus. For example, a UE may send a UE capabilities message that indicates that the UE supports certain groups, where the groups include certain ports (e.g., the UE supports group 0 including ports 0 and 2, group 1 including ports 1 and 3, and group 2 including ports 4, 5, 6, and 7).

In some examples, the first apparatus may select the active groups for the second apparatus based on the indication of the groups of antenna ports that are supported by the second apparatus. For example, depending in part on the requirements of a scheduled transmission for the second apparatus, the first apparatus may select a particular subset of the groups of antenna ports that are supported by the second apparatus.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) or some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
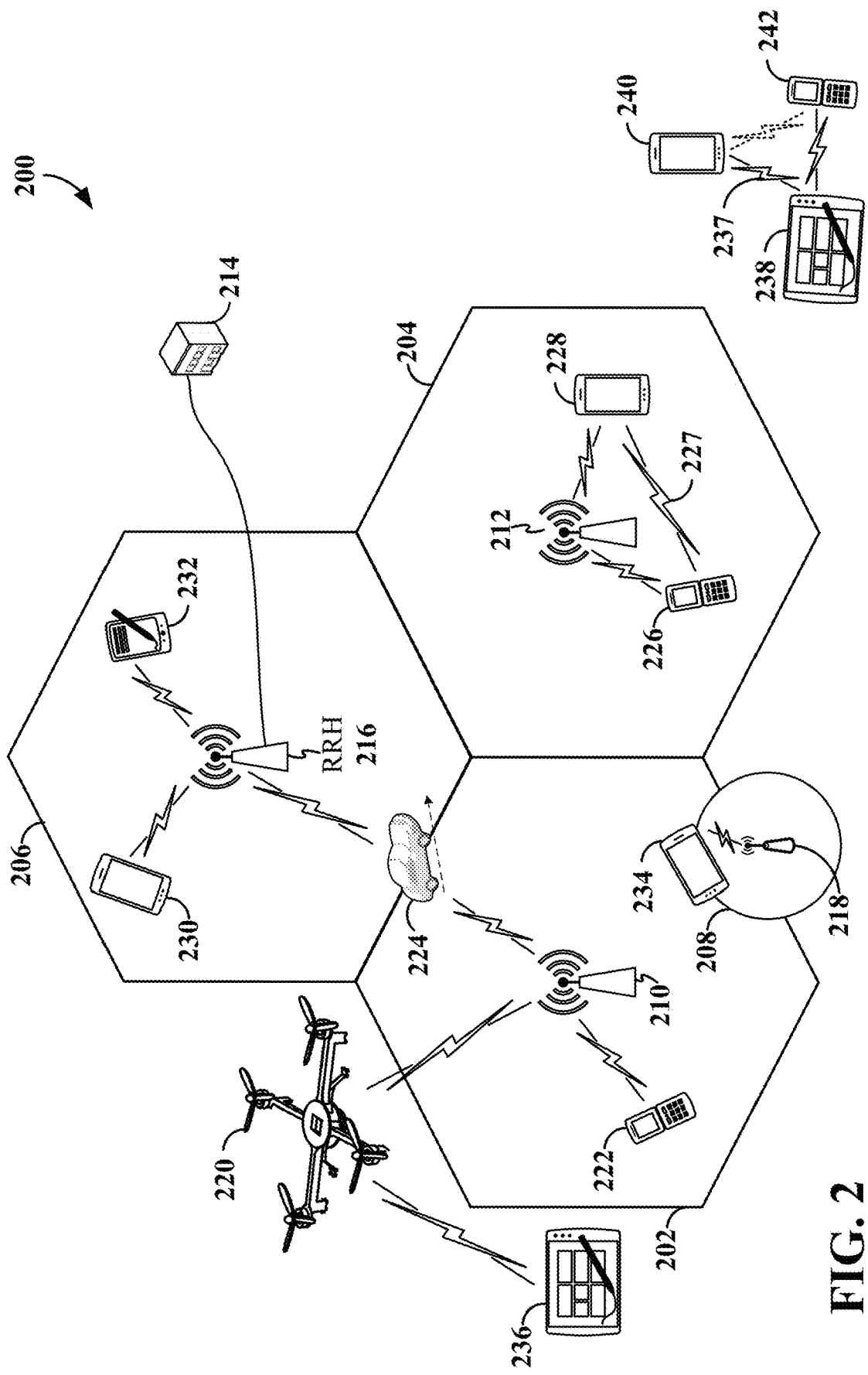
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
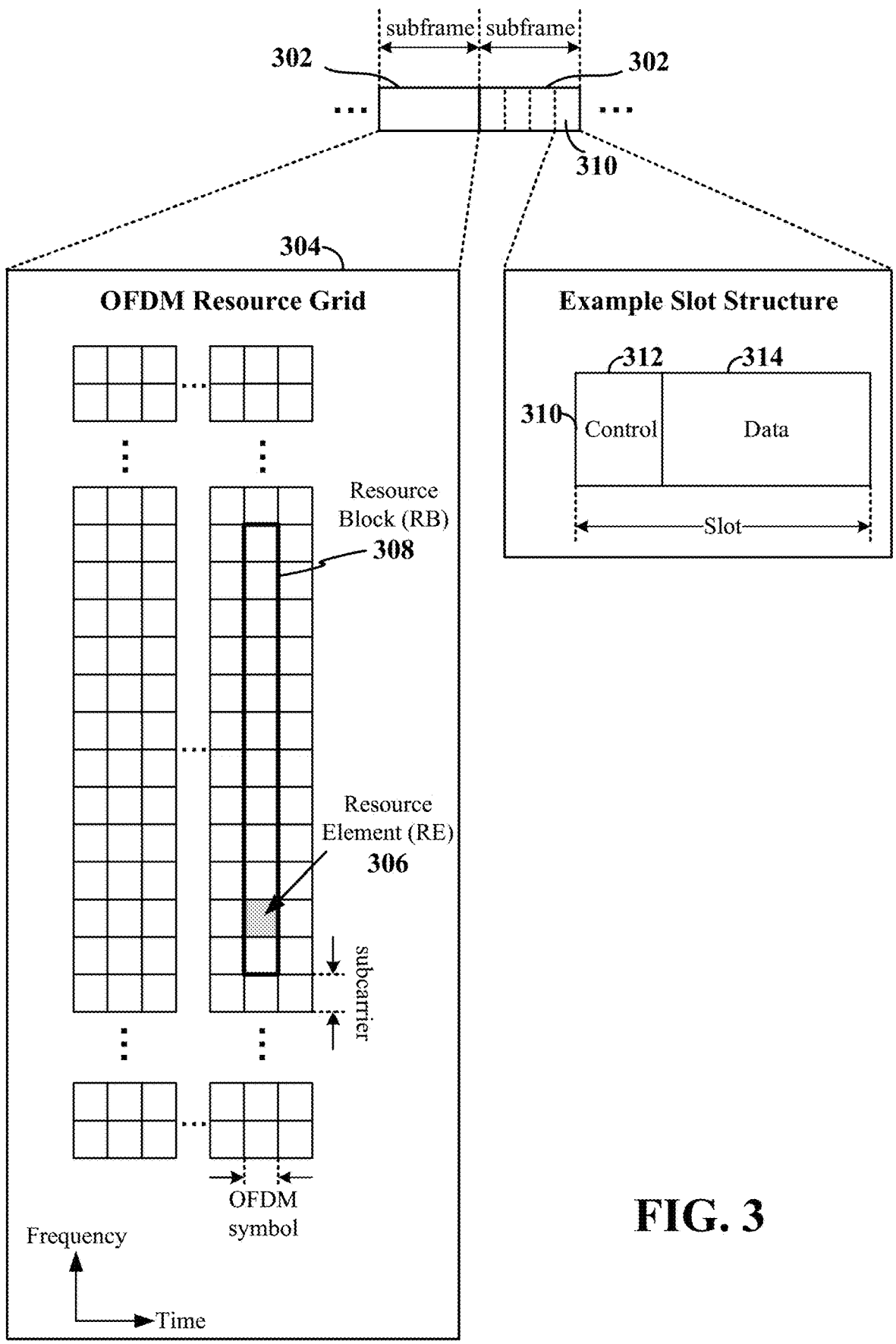
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
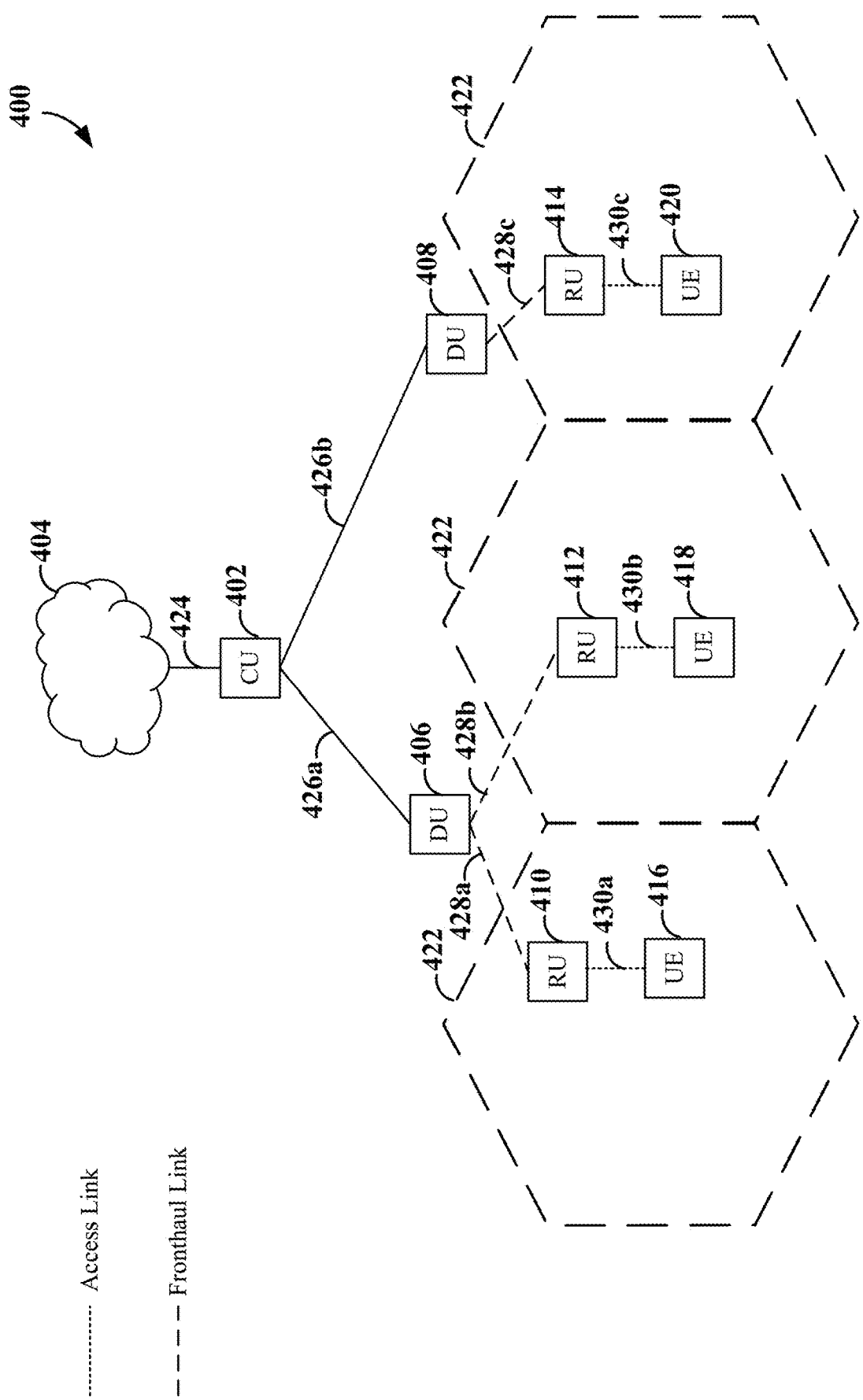
FIG. 4 is a schematic illustration of an example of distributed entities in a wireless communication network according to some aspects.

FIG. 4 is a diagram illustrating an example of a RAN 400 (e.g., a disaggregated RAN) including distributed wireless communication nodes (network entities) according to some aspects. The RAN 400 may be similar to the radio access network 200 shown in FIG. 2, in that the RAN 400 may be divided into a number of cells (e.g., cells 422) each of which may be served by respective network entities (e.g., control units, distributed units, and radio units). The network entities may constitute access points, base stations (BSs), eNBs, gNBs, or other nodes that utilize wireless spectrum (e.g., the radio frequency (RF) spectrum) and/or other communication links to support access for one or more UEs located within the cells. In some examples, some or all of the entities of FIG. 4 may be implemented as an integrated access backhaul (IAB). In some examples, some or all of the entities of FIG. 4 may be implemented according an open-radio access network (O-RAN) specification.

In some examples, the RAN 400 may be implemented, at least in part, according to a disaggregated base station architecture (e.g., where different base station functions may be implemented in different entities). In some examples, such an architecture may include RF functions, low PHY layer functions, high PHY layer functions, low MAC layer functions, high MAC layer functions, low radio link control (RLC) layer functions, high RLC layer functions, packet data convergence protocol (PDCP) layer functions, and radio resource control (RRC) layer functions that may be implemented in different network entities (e.g., control units, distributed units, and radio units) in different examples.

In the example of FIG. 4, a control unit (CU) 402 communicates with a core network 404 via a backhaul link 424, and communicates with a first distributed unit (DU) 406 and a second distributed unit 408 via respective midhaul links 426a and 426b. The first distributed unit 406 communicates with a first radio unit (RU) 410 and a second radio unit 412 via respective fronthaul links 428a and 428b. The second distributed unit 408 communicates with a third radio unit 414 via a fronthaul link 428c. The first radio unit 410 communicates with at least one UE 416 via at least one RF access link 430a. The second radio unit 412 communicates with at least one UE 418 via at least one RF access link 430b. The third radio unit 414 communicates with at least one UE 420 via at least one RF access link 430c.

In some examples, a control unit (e.g., the CU 402) is a logical node that hosts a PDCP layer, a RRC layer, a service data adaptation protocol (SDAP) layer and other control functions. A control unit may also terminate interfaces (e.g., an E1 interface, an E2 interface, etc., not shown in FIG. 4) to network entities (e.g., nodes of a core network). In addition, an F1 interface (not shown in FIG. 4) may provide a mechanism to interconnect a control unit (e.g., the PDCP layer and higher layers) and a distributed unit (e.g., the RLC layer and lower layers). In some aspects, an F1 interface may provide control plane and user plane functions (e.g., interface management, system information management, UE context management, RRC message transfer, etc.). For example, the F1 interface may support F1-C on the control plane and F1-U on the user plane. FLAP is an application protocol for F1 that defines signaling procedures for F1 in some examples.

In some examples, a distributed unit (e.g., the DU 406 or the DU 408) is a logical node that hosts an RLC layer, a medium access control (MAC) layer, and a high physical (PHY) layer based on a lower layer functional split (LLS). In some aspects, a distributed unit may control the operation of at least one radio unit. A distributed unit may also terminate interfaces (e.g., F1, E2, etc.) to the control unit and/or other network entities. In some examples, a high PHY layer includes portions of the PHY processing such as forward error correction 1 (FEC 1) encoding and decoding, scrambling, modulation, and demodulation.

In some examples, a radio unit (e.g., the RU 410, the RU 412, or the RU 414) is a logical node that hosts low PHY layer and radio frequency (RF) processing based on a lower layer functional split. In some examples, a radio unit may be similar to a 3GPP transmit receive point (TRP) or remote radio head (RRH), while also including the low PHY layer. In some examples, a low PHY layer includes portions of the PHY processing such as fast Fourier transform (FFT), inverse FFT (iFFT), digital beamforming, and physical random access channel (PRACH) extraction and filtering. The radio unit may also include a radio chain for communicating with one or more UEs.

The functionality splits between the entities of the RAN 400 may be different in different examples. In some examples, Layer 1 functions, Layer 2 functions, and Layer 3 functions may be allocated among the RU, DU, and CU entities. Examples of Layer 1 functions include RF functions and low PHY layer functions. Examples of Layer 2 functions include high PHY layer functions, low MAC layer functions, high MAC layer functions, low RLC layer functions, and high RLC layer functions. Examples of Layer 3 functions include PDCP layer functions and RRC layer functions. Other functionality splits may be used in other examples.

As discussed above, the two Layer 3 functions may be implemented in a CU in some examples. The other seven functions may thus be split between the RU and the DU in this case. In some examples, the Layer 1 functions are implemented in the RU and the Layer 2 functions are implemented in the DU. In some examples, all PHY functionality is implemented in the RU (i.e., the high PHY layer functions are implemented in the RU and not the DU). Other functionality splits may be used in other examples.

Different splits may be used between low layer functionality and high layer functionality in different examples. For example, the split between the low PHY layer functionality and the high PHY layer functionality may be defined between RE mapping and precoding in some cases. Thus, the RE mapping may be designated as a low PHY layer function performed by an RU and the precoding may be designated as a high PHY layer function performed by a DU in such a case. Other functionality splits may be used in other examples.

Figure 5:
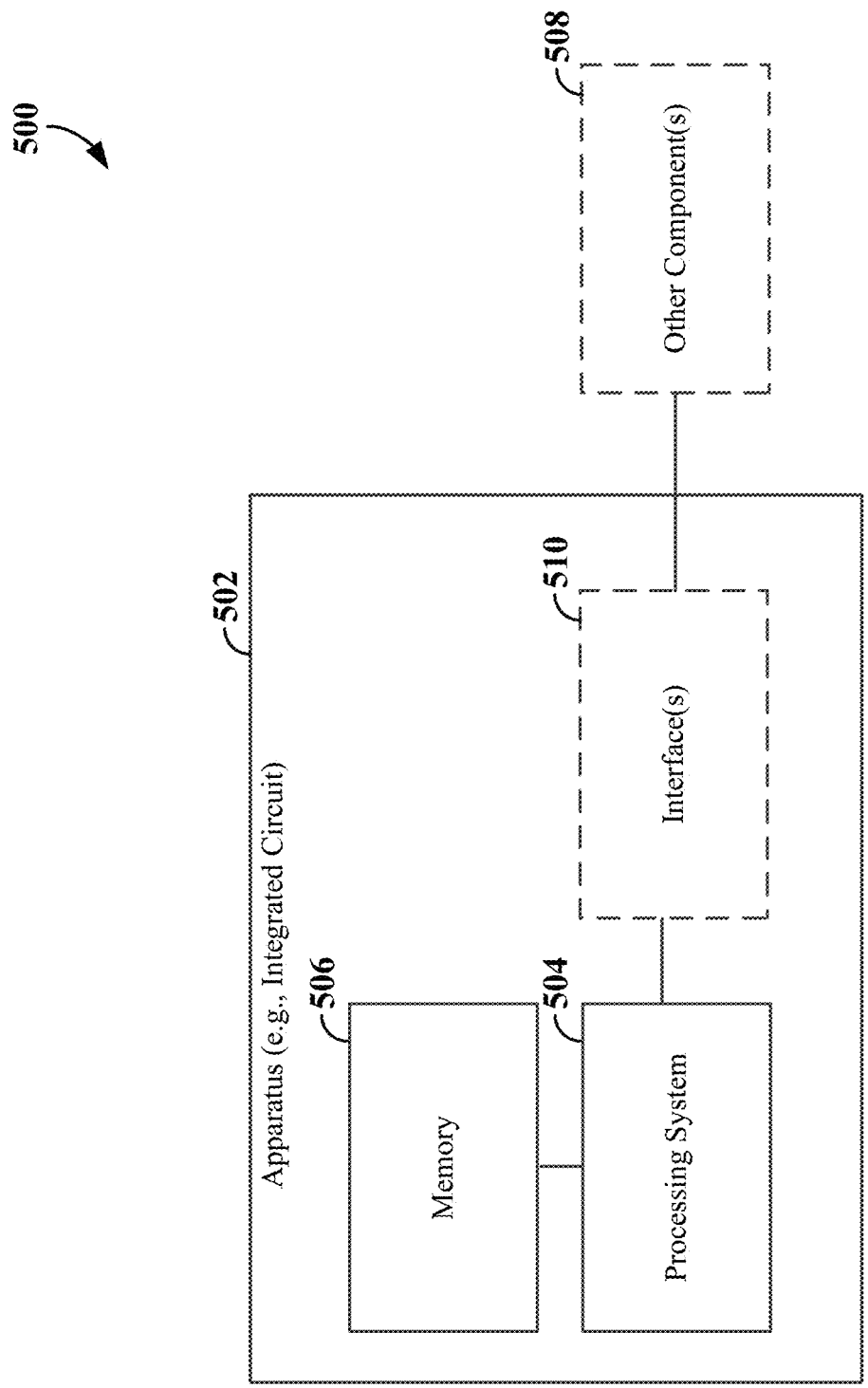
FIG. 5 is a schematic illustration of an example of an apparatus for communication according to some aspects.

FIG. 5 illustrates an example apparatus 500 according to certain aspects of the disclosure. In some examples, the apparatus 500 may be configured as a BS, a UE, or some other type of wireless node (e.g., a wireless communication device including a transmitter and/or a receiver). In some examples, the apparatus 500 may correspond to any of the apparatuses, UEs, scheduled entities, base stations (e.g., gNBs), scheduling entities, distributed units, control units, RAN nodes, or CN entities shown in any of FIGS. 1, 2, 4, 6, 12, 13, and 15.

The apparatus 500 includes an apparatus 502 (e.g., an integrated circuit) and, optionally, at least one other component 508. In some aspects, the apparatus 502 may be configured to operate in a wireless communication device (e.g., a UE, a BS, etc.) and to perform one or more of the operations described herein. The apparatus 502 includes a processing system 504, and a memory 506 coupled to the processing system 504. Example implementations of the processing system 504 are provided herein. In some examples, the processing system 504 of FIG. 5 may correspond to the processing system 1614 of FIG. 16. In some examples, the processing system 504 of FIG. 5 may correspond to the processing system 1814 of FIG. 18.

The processing system 504 is generally adapted for processing, including the execution of such programming stored on the memory 506. For example, the memory 506 may store instructions that, when executed by the processing system 504, cause the processing system 504 to perform one or more of the operations described herein.

In some implementations, the apparatus 502 communicates with at least one other component (e.g., a component 508 external to the apparatus 502) of the apparatus 500. To this end, in some implementations, the apparatus 502 may include at least one interface 510 (e.g., a send and/or receive interface) coupled to the processing system 504 for outputting and/or obtaining (e.g., sending and/or receiving) information (e.g., received information, generated information, decoded information, messages, etc.) between the processing system 504 and the other component(s) 508. In some implementations, the interface 510 may include an interface bus, bus drivers, bus receivers, buffers, other suitable circuitry, or a combination thereof. In some implementations, the interface 510 may include radio frequency (RF) circuitry (e.g., an RF transmitter and/or an RF receiver). In some implementations, the interface 510 may be configured to interface the apparatus 502 to one or more other components of the apparatus 500 (other components not shown in FIG. 5). For example, the interface 510 may be configured to interface the processing system 504 to a radio frequency (RF) front end (e.g., an RF transmitter and/or am RF receiver).

The apparatus 502 may communicate with other apparatuses in various ways. In cases where the apparatus 502 includes an RF transceiver (not shown in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface, to an RF front end for RF transmission. Similarly, rather than receiving information via RF signaling, the apparatus 502 may have an interface to obtain information that is received by another apparatus. For example, the processing system 504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

The apparatus 502 may perform various processing (e.g., encoding, modulation, etc.) operations in conjunction with transmitting a transmission. In addition, the apparatus 502 may perform various processing (e.g., decoding, demodulation, etc.) operations in conjunction with receiving a transmission.

As mentioned above, an apparatus may use one or more antenna ports for a transmission. In some examples, an antenna port is a logical entity used to map data streams to one or more antennas. Each antenna port may be associated with a reference signal (e.g., which may allow a receiver to distinguish data streams associated with the different antenna ports in a received transmission). For example, logical antenna ports 1000-1999 may be used for SRS transmissions in some networks. An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and subcarrier spacing (SCS) may be associated with a corresponding resource grid (including REs as discussed above). Here, modulated data symbols from MIMO layers may be combined and re-distributed to each of the antenna ports, then precoding is applied, and the precoded data symbols are applied to corresponding REs for OFDM signal generation and transmission via one or more physical antenna elements.

In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

Some apparatuses may include a relatively large number of antennas and, consequently, a relatively large number of antenna ports. Examples of such apparatuses include, without limitation, customer premises equipment (CPE), fixed wireless access (FWA) devices, vehicle-based communication devices, and industrial communication devices.

Figure 6:
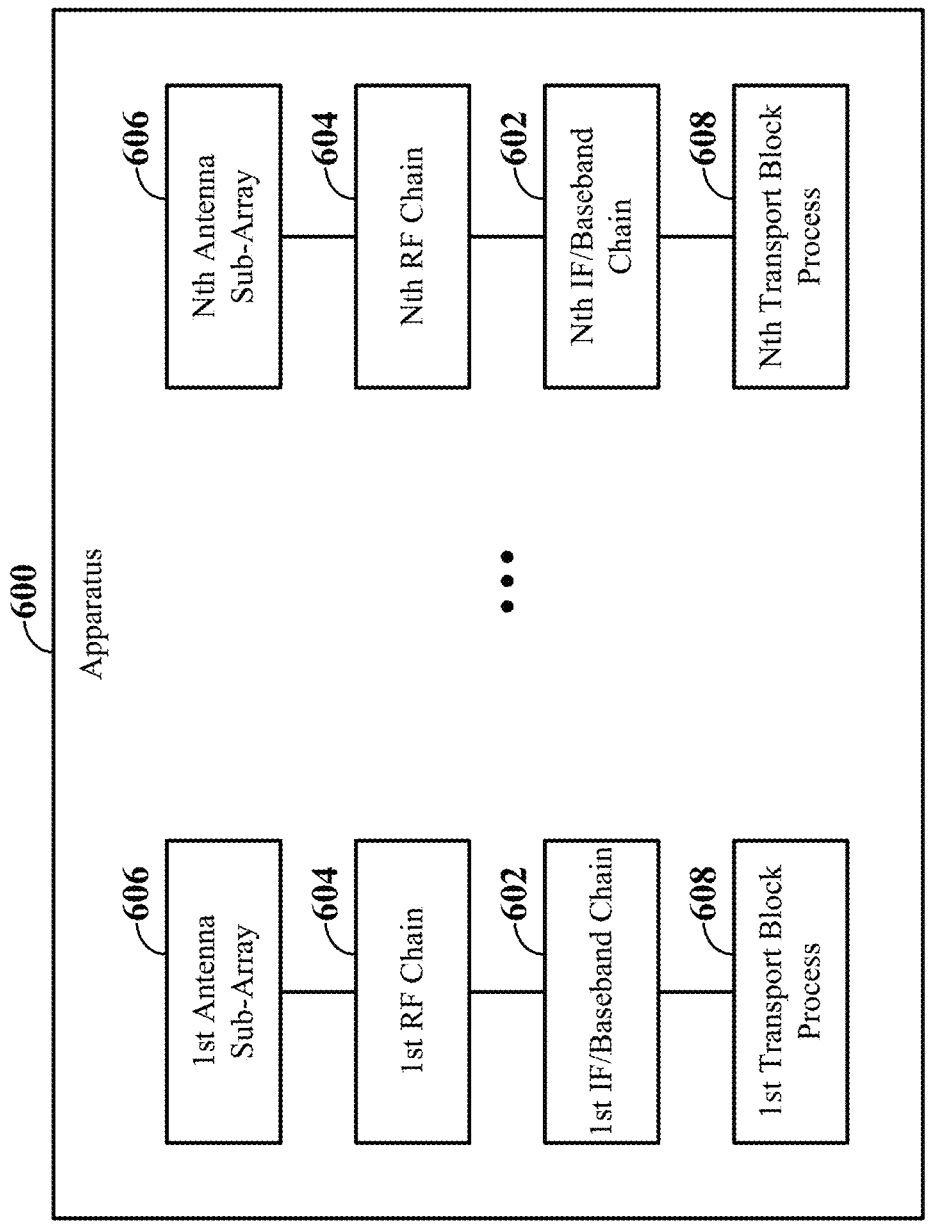
FIG. 6 is a schematic illustration of an example of an apparatus (e.g., a scheduled entity) with multiple antenna panels according to some aspects.

FIG. 6 illustrates an apparatus 600 (e.g., a CPE, an FWA device, etc.) that includes multiple antenna panels (e.g., antenna sub-arrays). In some examples, the apparatus 600 may correspond to any of the apparatuses, UEs, scheduled entities, base stations (e.g., gNBs), scheduling entities, distributed units, control units, RAN nodes, or CN entities shown in any of FIGS. 1, 2, 4, 5, 12, 13, and 15.

The apparatus 600 has "N" intermediate frequency (IF)/baseband chains 602. N could be 2 or more. Each IF chain can be connected to multiple RF chains 604 (M). M may be one or more. Each RF chain may connect to at least one antenna sub-array (or some other of antenna element(s)) 606. Thus, each IF/baseband chain 602 (e.g., used for a corresponding transport block process 608) can be connected to different antenna sub-arrays of the apparatus 600.

Multiple sub-arrays may be used to cover different beam directions. In some examples, rank 2 reception (e.g., two MIMO layers) at the apparatus 600 may be achieved by dual polarization at one sub-array (e.g., a patch antenna). In some implementations, rank 2 reception at the apparatus 600 may be achieved by {H,H}, {V,V}, {H,V}, {V,H} polarization where the H (horizontal) or V (vertical) polarizations are at different sub-arrays (e.g., dipole antennas). Other antenna configurations may be used in other examples.

In some examples, an apparatus may guarantee that its transmission over different antennas (or associated antenna ports) may be coherent. As used herein, coherency among antennas (or associated antenna ports) means that a particular phase difference of the signals transmitted using these antennas (or associated antenna ports) can be guaranteed. Different guaranteed phase differences may be specified in different examples.

A phase difference of zero may be guaranteed in some cases. For example, for two coherent antenna ports P0 and P1, if the network indicates that a precoder=$[1,1]^T$ is to be used, a phase difference=zero may be specified between the signals transmitted over these two antenna ports.

A phase difference of $\pi/2$ may be guaranteed in some cases. For example, if the network indicates that a precoder=$[1,j]^T$ is to be used, a phase difference=$\pi/2$ may be specified between the signals transmitted over these two antenna ports.

In some examples (e.g., when a relatively large number of transmit antennas are employed at an apparatus), it may be difficult or impractical to maintain coherence (phase coherency) among the transmit antennas (or associated antenna ports). For example, the use of a large number of antennas may result in the distance between some of the antennas being longer than the distance between other antennas. As another example, the use of a large number of antennas may result in some of the antennas being implemented on (or connected to) one circuit while other antennas are implemented on (or connected to) another circuit. These factors and potentially other factors may adversely affect the phase coherency between all of the antennas (or associated antenna ports).

As a specific example, an apparatus such as a CPE, an FWA device, a vehicle-based communication device, an industrial communication device, or some other type of apparatus may support eight transmit antenna ports. In this case, it may be difficult or impractical to maintain coherence among all eight transmit antenna ports. Consequently, the antenna ports may be partitioned into several groups, where the antenna ports within a group are coherent, while the antenna ports across different groups are not coherent.

Figure 7:
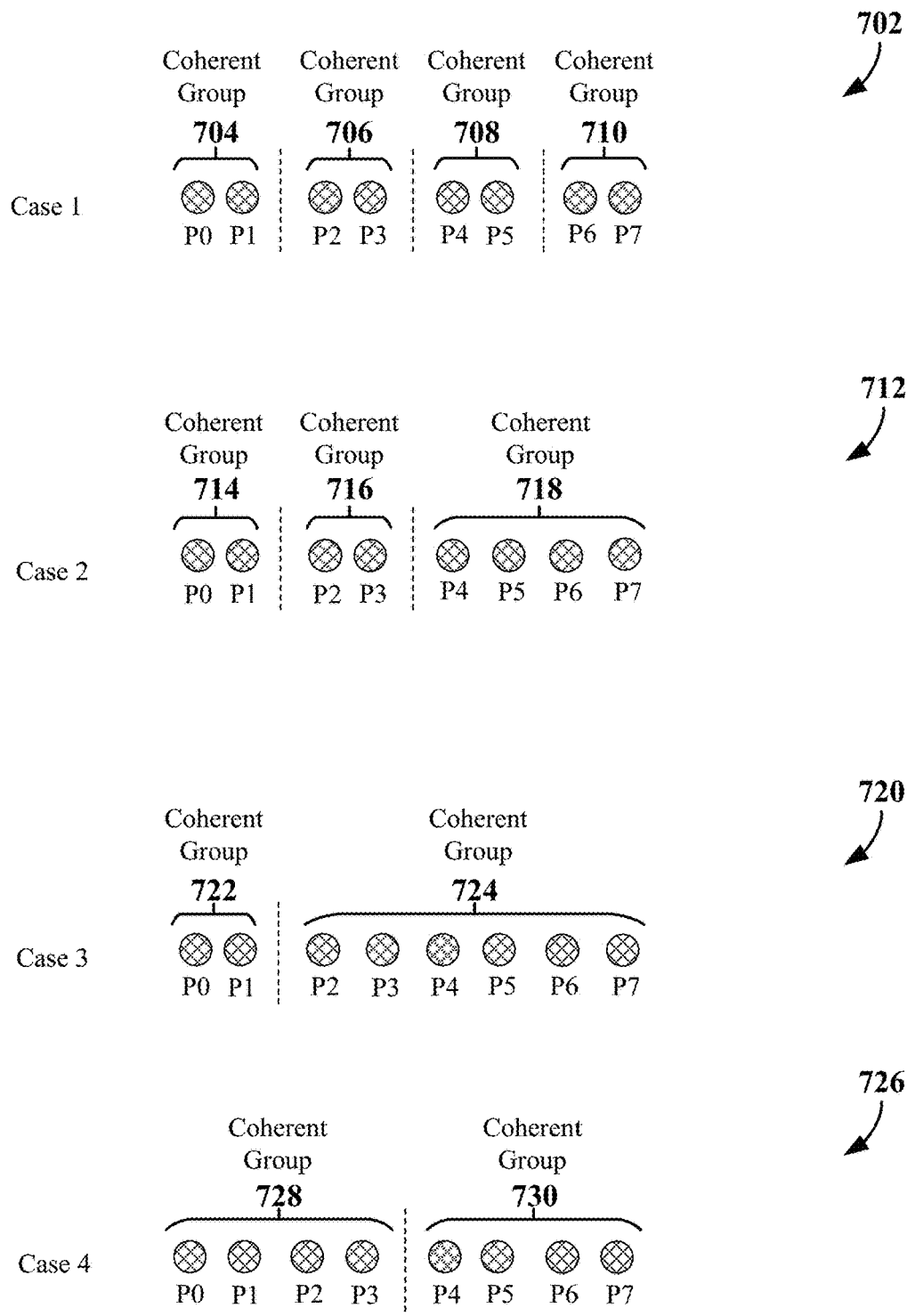
FIG. 7 is a conceptual illustration of different examples of groups of antenna ports according to some aspects.

FIG. 7 illustrates four examples of groups of antenna ports. Other groupings may be using in other examples.

A first example 702 illustrates a Case 1 where the antenna grouping is 2+2+2+2. Here, a first antenna port group 704 includes antenna ports P0 and P1, where coherency is guaranteed among antenna ports P0 and P1. A second antenna port group 706 includes antenna ports P2 and P3, where coherency is guaranteed among antenna ports P2 and P3. A third antenna port group 708 includes antenna ports P4 and P5, where coherency is guaranteed among antenna ports P4 and P5. A fourth antenna port group 710 includes antenna ports P6 and P7, where coherency is guaranteed among antenna ports P6 and P7. In Case 1, coherency is not guaranteed across the antenna groups (e.g., coherency is not guaranteed between the first antenna port group 704 and the second antenna port group 706, between the first antenna port group 704 and the third antenna port group 708, and so on).

A second example 712 illustrates a Case 2 where the antenna grouping is 2+2+4. Here, a first antenna port group 714 includes antenna ports P0 and P1, where coherency is guaranteed among antenna ports P0 and P1. A second antenna port group 716 includes antenna ports P2 and P3, where coherency is guaranteed among antenna ports P2 and P3. A third antenna port group 718 includes antenna ports P4, P5, P6, and P7, where coherency is guaranteed among antenna ports P4, P5, P6, and P7. In Case 2, coherency is not guaranteed across the antenna groups (e.g., coherency is not guaranteed between the first antenna port group 714 and the second antenna port group 716, between the first antenna port group 714 and the third antenna port group 718, and so on).

A third example 720 illustrates a Case 3 where the antenna grouping is 2+6. Here, a first antenna port group 722 includes antenna ports P0 and P1, where coherency is guaranteed among antenna ports P0 and P1. A second antenna port group 724 includes antenna ports P2, P3, P4, P5, P6, and P7, where coherency is guaranteed among antenna ports P2, P3, P4, P5, P6, and P7. In Case 3, coherency is not guaranteed across the antenna groups (e.g., coherency is not guaranteed between the first antenna port group 722 and the second antenna port group 724).

A fourth example 726 illustrates a Case 4 where the antenna grouping is 4+4. Here, a first antenna port group 728 includes antenna ports P0, P1, P2, and P3, where coherency is guaranteed among antenna ports P0, P1, P2, and P3. A second antenna port group 730 includes antenna ports P4, P5, P6, and P7, where coherency is guaranteed among antenna ports P4, P5, P6, and P7. In Case 4, coherency is not guaranteed across the antenna groups (e.g., coherency is not guaranteed between the first antenna port group 728 and the second antenna port group 730).

The disclosure relates in some aspects to an apparatus signaling its capabilities with respect to the number and properties of the antenna port groups supported by the apparatus. For example, an apparatus may transmit capability information that indicates one or more of how many antenna port groups the apparatus supports, the number of antenna ports in each group, the specific antenna ports in each group, or which previously defined antenna port groups the apparatus supports.

As a more specific example, a UE (e.g., a CPE, an FWA device, a vehicle-based communication device, an industrial communication device, etc.) may signal capability information for coherence grouping where the UE reports the information that follows. Two bits are used to indicate which one of the four cases (Cases 1-4) discussed above are supported (e.g., information as to how many groups are supported and how many ports are in each group). For each case (Case 1-4), the signaling may indicate the antenna ports included in each group. For example, if the UEs reports that it supports Case 2 (2+2+4), the UE may further report that Group 0={port 0, 2}, Group 1={port 1, 3}, and Group 2={port 4, 5, 6, 7}.

Upon receiving the above capability information, a network node may select which antenna port group or groups are deemed to be active for the apparatus that advertised the capability information, For example, a base station (e.g., a gNB) that schedules a UE (e.g., a CPE, an FWA device, etc.) for an uplink transmission may select the active antenna port group(s) and associated TPMI(s) to be used by the UE for the uplink transmission. In some aspects, this selection may be based on the antenna port groups supported by the UE. For example, depending on the requirements of the uplink transmission (e.g., bandwidth, MCS, etc.) the base station may select a particular antenna port group or a set of antenna port groups from the antenna port groups supported by the UE. In addition, the base station may select the TPMI to be used for a particular antenna port group. This selection may be dynamic (e.g., the base station select the TPMI based on the requirements of the scheduled uplink transmission) and/or the base station may use a defined mapping between antenna port groups and TPMIs.

The disclosure relates in some aspects to signaling the active group(s) and associated TPMI(s). For example, a base station (e.g., a gNB) that schedules a UE (e.g., a CPE, an FWA device, etc.) for an uplink transmission may configure designated fields in the scheduling DCI to signal the active group(s) and associated TPMI(s). In some examples, the TPMI for a group of antenna ports may be signaled in a DCI via a field "Precoding information and number of layers."

Figure 8:
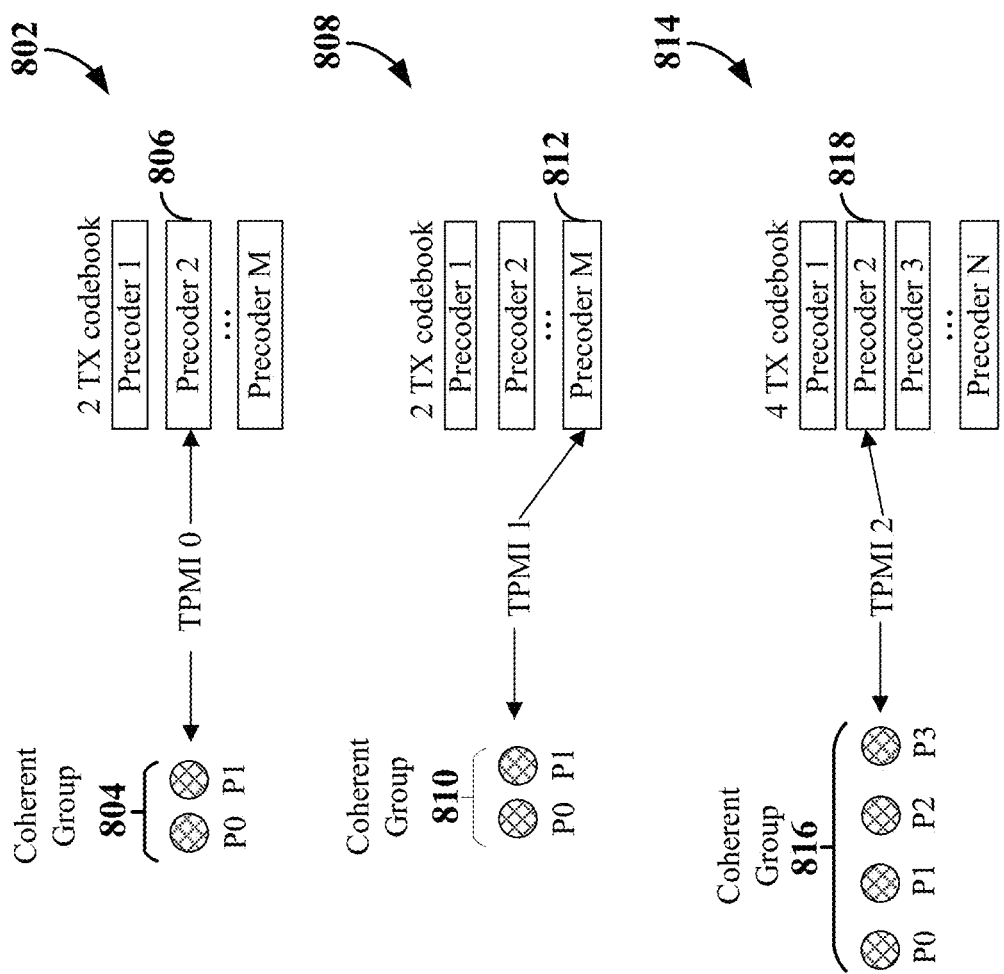
FIG. 8 is a conceptual illustration of different examples of mapping transmit precoding matrix indicators (TPMIs) for different groups of antenna ports to different precoders according to some aspects.

FIG. 8 illustrates several examples of how a TPMI may map a particular antenna port group to a particular precoder of a corresponding precoder codebook. In a first example 802, a TPMI index designated TPMI 0 is specified for a first antenna port group 804. In the example of FIG. 8, TPMI 0 is a particular value (e.g., a two-bit number 01) that specifies a precoder 2 806 in a codebook that is defined for two transmit antenna ports (2 TX codebook). Other values for TPMI 0 may be specified in other examples.

In a second example 808, a TPMI index designated TPMI 1 is specified for a second antenna port group 810. In the example of FIG. 8, TPMI 1 is a particular value (e.g., a two-bit number 11) that specifies a precoder M 812 in a codebook that is defined for two transmit antenna ports (2 TX codebook). Other values for TPMI 1 may be specified in other examples.

In a third example 814, a TPMI index designated TPMI 2 is specified for a third antenna port group 816. In the example of FIG. 8, TPMI 2 is a particular value (e.g., a three-bit number 001) that specifies a precoder 2 818 in a codebook that is defined for four transmit antenna ports (4 TX codebook). Other values for TPMI 4 may be specified in other examples.

In some examples, the number of bits used to represent different TPMIs (e.g., TPMI0, TPMI1, and TPMI2) could be different. For example, two bits may be used to identify a precoder of a 2 TX codebook, while four bits may be used to identify a precoder of a 4 TX codebook. Some other numbers of bits may be used in other examples.

A precoder may take different forms in different examples. For example, a first codebook may take the form $[0,1,0,1]^T$, a second codebook may take the form $[0,1,0,j]^T$, a third codebook may take the form $[0,1,0,-j]^T$, and so on. In some examples, the codebooks and associated precoders are predefined (e.g., defined by a wireless communication standard).

FIG. 9 illustrates an example 900 of how active groups and associated TPMI(s) may be signaled (e.g., in a designated field of a DCI). Other signaling combinations may be used in other examples (e.g., for a different number of groups).

In the example of FIG. 9, the signaling includes an active group indicator and an associated TPMI index. For example, a scheduling DCI may include a three bit active group indicator and a bit field for the TPMI indices.

In the example 902 (the first row), the active group indicator has the value [0,0,1] indicating that only Group 2 is active. In addition, the TPMI index has a null value for Groups 0 and 1, and a value corresponding to TPMI 2 for Group 2. Thus, a TPMI is specified only for the active group (Group 2).

In the example 904 (the second row), the active group indicator has the value [0,1,0] indicating that only Group 1 is active. In this case, the TPMI index has a null value for Groups 0 and 2, and a value corresponding to TPMI 1 for Group 1. Again, a TPMI is specified only for the active group (Group 1).

In the example 906 (the last row), the active group indicator has the value [1,1,1] indicating that Groups 0, 1, and 2 are active. In this case, the TPMI index has a value corresponding to TPMI 0 for Group 0, a value corresponding to TPMI 1 for Group 1, and a value corresponding to TPMI 2 for Group 2.

In the example of FIG. 9, the overhead for TPMI signaling may be relatively high since separate TPMI indicators may be signaled for the different groups. To reduce TPMI signaling overhead, a single (i.e., the same) TPMI indicator may be used for all groups (or a subset of the groups). For example, if the TPMI=x, the x-th precoder in the 2 TX precoder codebook may be applied to groups 0 and 1. In addition, the x-th precoder in the 4 TX precoder codebook may be applied to group 2.

Figure 10:
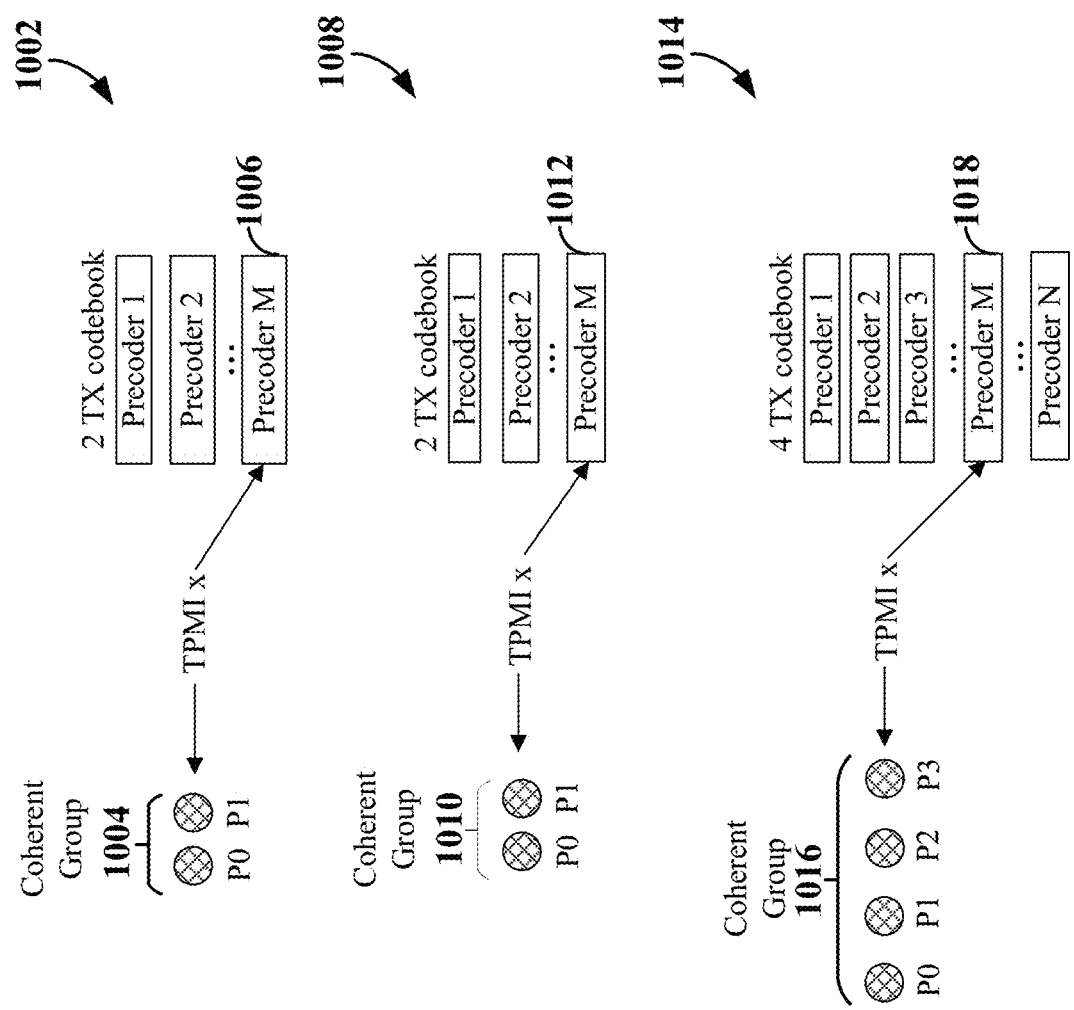
FIG. 10 is a conceptual illustration of an example where a single transmit precoding matrix indicator (TPMI) is used to map different groups of antenna ports to different precoders according to some aspects.

FIG. 10 illustrates several examples of how a single TPMI index may map a particular antenna port group to a particular precoder of a corresponding precoder codebook. In these examples, the same TPMI index (designated TPMI x) is specified for each of the antenna port groups.

In a first example 1002, a TPMI index designated TPMI x is specified for a first antenna port group 1004. In the example of FIG. 10, TPMI x is a particular value (e.g., a two-bit number 01) that specifies a precoder M 1006 in a codebook that is defined for two transmit antenna ports (2 TX codebook). Other values for TPMI x may be specified in other examples.

In a second example 1008, the same TPMI index (TPMI x) is specified for a second antenna port group 1010. Thus, TPMI x again specifies a precoder M 1012 in a codebook that is defined for two transmit antenna ports (2 TX codebook).

In a third example 1014, the same TPMI index (TPMI x) is specified for a third antenna port group 1016. Thus, TPMI x again specifies a precoder M 1018, this time in a codebook that is defined for four transmit antenna ports (4 TX codebook).

The size of the TPMI index may correspond to the smallest codebook, the largest codebook, or some other sized codebook. For example, in FIG. 10, the TPMI index could be sized to uniquely identify M precoders, but no more than M precoders. As another example, the TPMI index could be sized to uniquely identify N precoders.

In some examples, the size of the TPMI index may correspond to the smallest codebook so that fewer bits are used for the TPMI index. In this case, however, not all of the codebooks of the largest codebook would be used since the TPMI index is not large enough to uniquely identify each precoder in the largest codebook.

In some examples, the size of the TPMI index may correspond to the largest codebook so that the TPMI index is large enough to uniquely identify each precoder in the largest codebook. In this case, however, there may be an ambiguity with respect to the smaller codebooks (e.g., a TPMI index value may point to a precoder N that does not exist in the 2 TX codebook).

Various procedures may be used to address such an ambiguity. In some examples, a default precoder may be specified in the event there is an ambiguity (e.g., the TPMI index points to a precoder that does not exist). In some examples, an apparatus (e.g., a UE) may ignore one or more bits (e.g., the most significant bit, the least significant bit, etc.) of the TPMI index (e.g. so that the resulting size of the TPMI index corresponds to the size the corresponding codebook).

FIG. 11 illustrates an example 1100 of how active groups and an associated TPMI may be signaled (e.g., in a designated field of a DCI). Other signaling combinations may be used in other examples (e.g., for a different number of groups).

In the example of FIG. 11, the signaling includes an active group indicator and a single associated TPMI index. For example, a scheduling DCI may include a three bit active group indicator and a bit field for the single TPMI index.

In the example 1102 (the first row), the active group indicator has the value [0,0,1] indicating that only Group 2 is active. In addition, the TPMI index has the value that is specified for all of the active groups (only Group 2 in this case).

In the example 1104 (the second row), the active group indicator has the value [0,1,0] indicating that only Group 1 is active. In addition, the TPMI index has the value that is specified for all of the active groups (only Group 1 in this case).

In the example 1106 (the last row), the active group indicator has the value [1,1,1] indicating that Groups 0, 1, and 2 are active. In addition, the TPMI index has the value that is specified for all of the active groups. Thus, in this case, the same TPMI index is specified for Group 0, Group 1, and Group 2.

Figure 12:
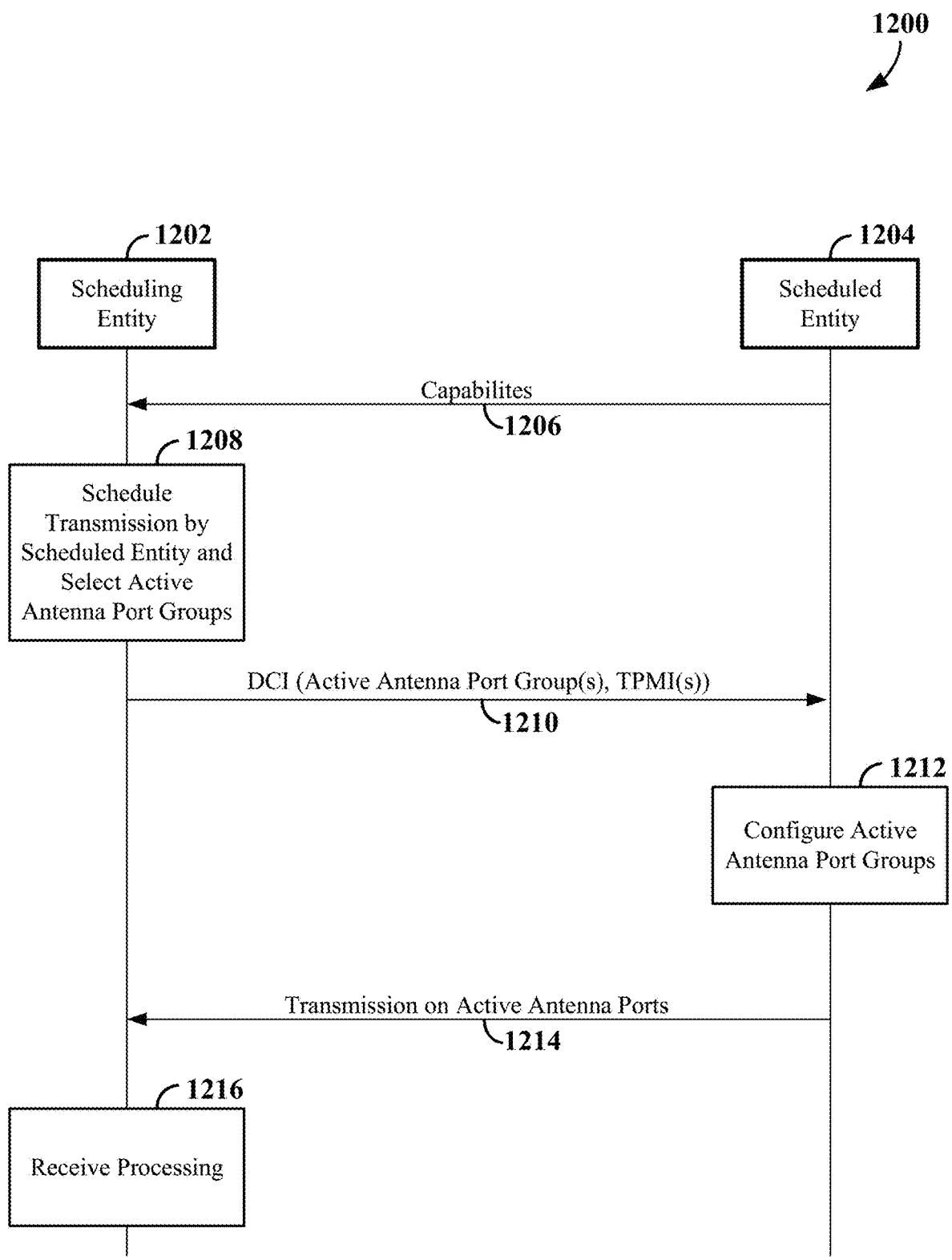
FIG. 12 is a signaling diagram illustrating an example of signaling for configuring active groups of antenna ports according to some aspects.

FIG. 12 is a signaling diagram 1200 illustrating an example of signaling an indication of active antenna port groups in a wireless communication system including a scheduling entity 1202 and a scheduled entity 1204. In some examples, the scheduling entity 1202 may correspond to any of the network entities, base stations, CUs, DU, RUs, or scheduling entities shown in any of FIGS. 1, 2, 4, 5, 6, and 15. In some examples, the scheduled entity 1204 may correspond to any of the UEs, CPEs, FWAs, vehicle communication devices, industrial communication devices, RUs, network entities, or scheduled entities shown in any of FIGS. 1, 2, 4, 5, 6, and 13.

At #1206 of FIG. 12, the scheduled entity 1204 advertises its capabilities. For example, the scheduled entity 1204 may transmit a capabilities message that indicates the antenna port groups that are supported by the scheduled entity 1204.

At #1208, the scheduling entity 1202 schedules a transmission to be conducted by the scheduled entity 1204 on specified resources and selects the active antenna port groups for the transmission. For example, the scheduling entity 1202 may select the active antenna port group(s) from the antenna port groups indicated by the scheduled entity at #1206. In addition, the scheduling entity 1202 may identify the TPMI(s) associated with the active antenna port group(s). In some examples, the scheduled transmission may be a PUSCH transmission. In some examples, the scheduled transmission may be a transmission to a UE (e.g., a cellphone, etc.). In some examples, the scheduled transmission may be a PSSCH transmission. Other types of transmissions may be scheduled in other examples.

At #1210, the scheduling entity 1202 transmits a DCI for the transmission. As discussed herein, the DCI may include scheduling information (e.g., resources, MCS, etc.) for the transmission, along with an indication of active antenna port group(s) and associated TPMI(s).

At #1212, the scheduled entity 1204 configures the active antenna port group(s) specified for that transmission. For example, the scheduled entity 1204 may identify the precoder(s) to be used by the scheduled entity 1204 for the active antenna port group(s) based on the indication of active antenna port group(s) and associated TPMI(s) received at #1210.

At #1214, the scheduled entity 1204 transmits the transmission on the scheduled resources using the active antenna port group(s). For example, the scheduled entity 1204 may encode the transmission using the precoder(s) specified by the TPMI(s) associated with the active antenna port group(s).

At #1216, the scheduling entity 1202 or some other apparatus processes the transmission received at #1212. For example, the scheduling entity 1202 may receive the transmission using knowledge of the precoders used by the scheduled entity 1204 for the transmission.

Figure 13:
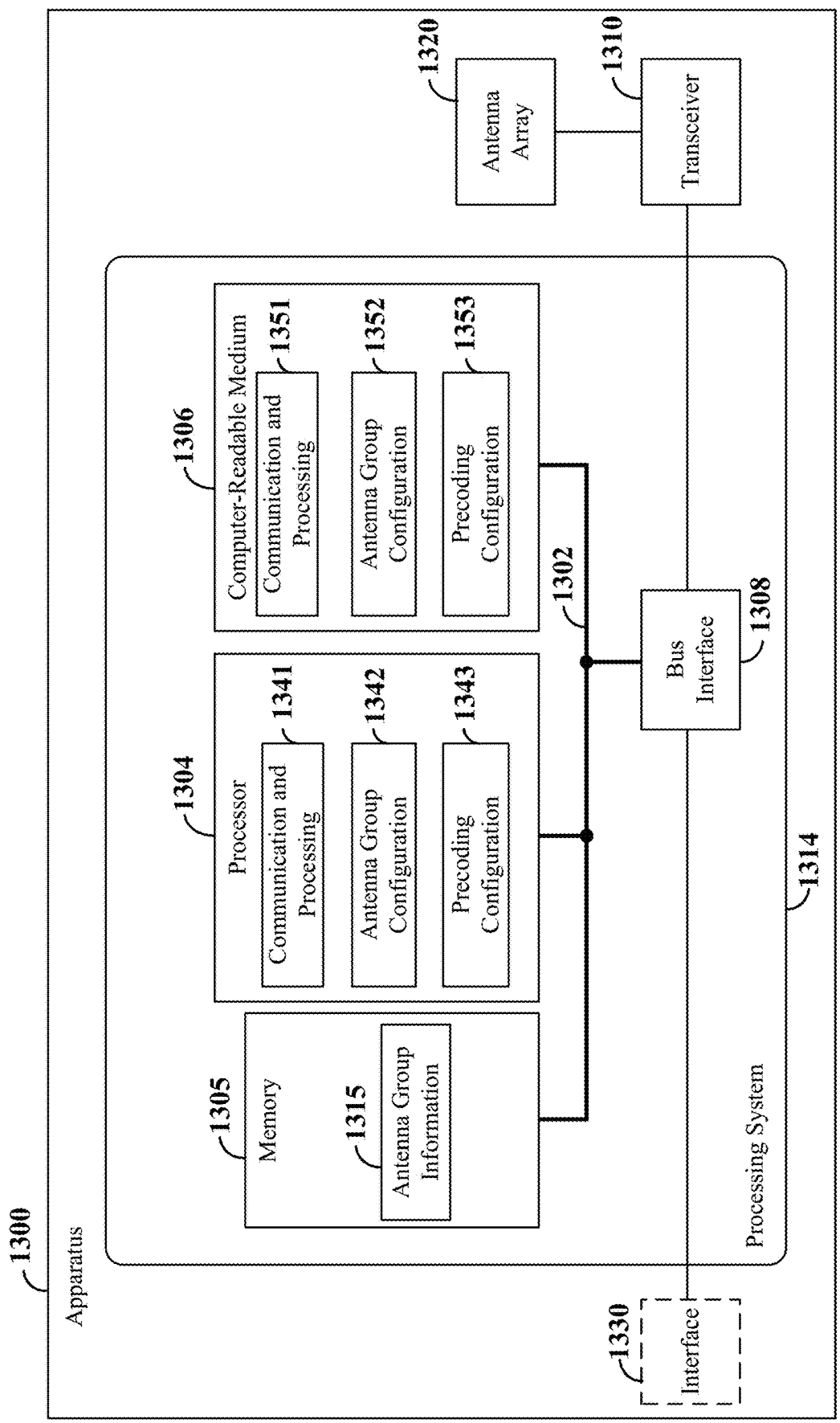
FIG. 13 is a block diagram conceptually illustrating an example of a hardware implementation for an apparatus (e.g., a scheduled entity) employing a processing system according to some aspects.

FIG. 13 is a block diagram illustrating an example of a hardware implementation for an apparatus 1300 employing a processing system 1314. For example, the apparatus 1300 may be a device configured to wirelessly communicate with a scheduling entity, as discussed in any one or more of FIGS. 1-12. In some implementations, the apparatus 1300 may correspond to any of the UE s, CPEs, FWAs, vehicle communication devices, industrial communication devices, RUs, network entities, or scheduled entities shown in any of FIGS. 1, 2, 4, 5, 6, and 12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1300 may be configured to perform any one or more of the functions described herein. That is, the processor 1304, as utilized in an apparatus 1300, may be used to implement any one or more of the processes and procedures described herein.

The processor 1304 may in some instances be implemented via a baseband or modem chip and in other implementations, the processor 1304 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302, a transceiver 1310 and an antenna array 1320 and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the scheduled entity or other external apparatuses) over an internal bus or external transmission medium, such as an Ethernet cable. Depending upon the nature of the apparatus 1300, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store antenna group information 1315 (e.g., active group information and associated TPMIs) used by the processor 1304 for the antenna port-related operations described herein.

One or more processors 1304 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1300 may be configured to perform any one or more of the operations described herein (e.g., as described above in conjunction with FIGS. 1-12 and as described below in conjunction with FIG. 14). In some aspects of the disclosure, the processor 1304, as utilized in the apparatus 1300, may include circuitry configured for various functions.

The processor 1304 may include communication and processing circuitry 1341. The communication and processing circuitry 1341 may be configured to communicate with a scheduling entity, such as a gNB. The communication and processing circuitry 1341 may be configured to communicate with a base station and one or more other wireless communication devices over a common carrier shared between a cellular (e.g., Uu) interface and a sidelink (e.g., PC5) interface. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains (e.g., one chain to communicate with a base station and another chain to communicate with a sidelink device). The communication and processing circuitry 1341 may further be configured to execute communication and processing software 1351 included on the computer-readable medium 1306 to implement one or more functions described herein.

In some implementations where the communication involves obtaining (e.g., receiving) information, the communication and processing circuitry 1341 may obtain information from a component of the apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may receive one or more of signals, messages, SCIs, feedback, other information, or any combination thereof. In some examples, the communication and processing circuitry 1341 may receive information via one or more of a PSCCH, a PSSCH, a PSFCH, some other type of channel, or any combination thereof. In some examples, the communication and processing circuitry 1341 may include functionality for a means for obtaining (e.g., obtaining indications, signals, TPMIs, etc., from another apparatus). In some examples, the communication and processing circuitry 1341 may include functionality for a means for receiving (e.g., receiving indications). In some examples, the communication and processing circuitry 1341 may include functionality for a means for decoding. In some examples, the communication and processing circuitry 1341 may include functionality for a means for obtaining signals associated with at least one antenna port of at least one active antenna port group (e.g., as described above in conjunction with FIGS. 7-12). For example, the communication and processing circuitry 1341 may be configured to receive signals transmitted by another apparatus on different layers and/or on different beams.

In some implementations where the communication involves outputting (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may send one or more of signals, messages, SCIs, feedback, other information, or any combination thereof. In some examples, the communication and processing circuitry 1341 may send information via one or more of a PSCCH, a PSSCH, a PSFCH, some other type of channel, or any combination thereof. In some examples, the communication and processing circuitry 1341 may include functionality for a means for outputting (e.g., outputting indications or other information to another apparatus). In some examples, the communication and processing circuitry 1341 may include functionality for a means for sending (e.g., sending indications or other information to another entity). In some examples, the communication and processing circuitry 1341 may include functionality for a means for transmitting (e.g., transmitting signals via at least one antenna port). In some examples, the communication and processing circuitry 1341 may include functionality for a means for encoding. In some examples, the communication and processing circuitry 1341 may include functionality for a means for outputting, for transmission, signals for at least one antenna port of at least one active antenna port group (e.g., as described above in conjunction with FIGS. 7-12). For example, the communication and processing circuitry 1341 may be configured to transmit signals for a first antenna port via a first antenna, transmit signals for a second antenna port via a second antenna, etc.

The processor 1304 may include antenna group configuration circuitry 1342 configured to perform antenna group configuration-related operations as discussed herein (e.g., one or more of the operations described above in conjunction with FIGS. 7-12). The antenna group configuration circuitry 1342 may be configured to execute antenna group configuration software 1352 included on the computer-readable medium 1306 to implement one or more functions described herein.

The antenna group configuration circuitry 1342 may include functionality for a means for obtaining an indication of at least one active group of a plurality of groups of antenna ports (e.g., as described above in conjunction with FIGS. 7-12). For example, the antenna group configuration circuitry 1342 together with the communication and processing circuitry 1341 and the transceiver 1310 may receive a DCI on a PDCCH, and decode the DCI to extract an active group indicator.

The antenna group configuration circuitry 1342 may include functionality for a means for outputting, for transmission, an indication of particular groups of a plurality of groups of antenna ports that are supported by the apparatus (e.g., as described above in conjunction with FIGS. 7-12). For example, the antenna group configuration circuitry 1342 together with the communication and processing circuitry 1341 and the transceiver 1310 may be configured to transmit a capabilities message including this indication on a PUSCH or a PUCCH.

The antenna group configuration circuitry 1342 may include functionality for a means for outputting, for transmission, an indication of at least one respective antenna port in each of the particular groups supported by the apparatus (e.g., as described above in conjunction with FIGS. 7-12). For example, the antenna group configuration circuitry 1342 together with the communication and processing circuitry 1341 and the transceiver 1310 may be configured to transmit a capabilities message including this indication on a PUSCH or a PUCCH.

The antenna group configuration circuitry 1342 may include functionality for a means for outputting, for transmission, signals for at least one antenna port of at least one active antenna port group (e.g., as described above in conjunction with FIGS. 7-12). For example, the antenna group configuration circuitry 1342 together with the communication and processing circuitry 1341 and the transceiver 1310 may be configured to transmit signals for a first antenna port via a first antenna, transmit signals for a second antenna port via a second antenna, etc.

The processor 1304 may include precoding configuration circuitry 1343 configured to perform precoding configuration-related operations as discussed herein (e.g., one or more of the operations described above in conjunction with FIGS. 7-12). The precoding configuration circuitry 1343 may be configured to execute precoding configuration software 1353 included on the computer-readable medium 1306 to implement one or more functions described herein.

The precoding configuration circuitry 1343 may include functionality for a means for obtaining an indication of at least one precoder (e.g., as described above in conjunction with FIGS. 7-12). For example, the precoding configuration circuitry 1343 together with the communication and processing circuitry 1341 and the transceiver 1310 may receive a DCI on a PDCCH, and decode the DCI to extract precoder information.

The precoding configuration circuitry 1343 may include functionality for a means for obtaining at least one TPMI (e.g., as described above in conjunction with FIGS. 7-12). For example, the precoding configuration circuitry 1343 together with the communication and processing circuitry 1341 and the transceiver 1310 may receive a DCI on a PDCCH, and decode the DCI to extract one or more TPMI indices associated with an active group indicator.

Figure 14:
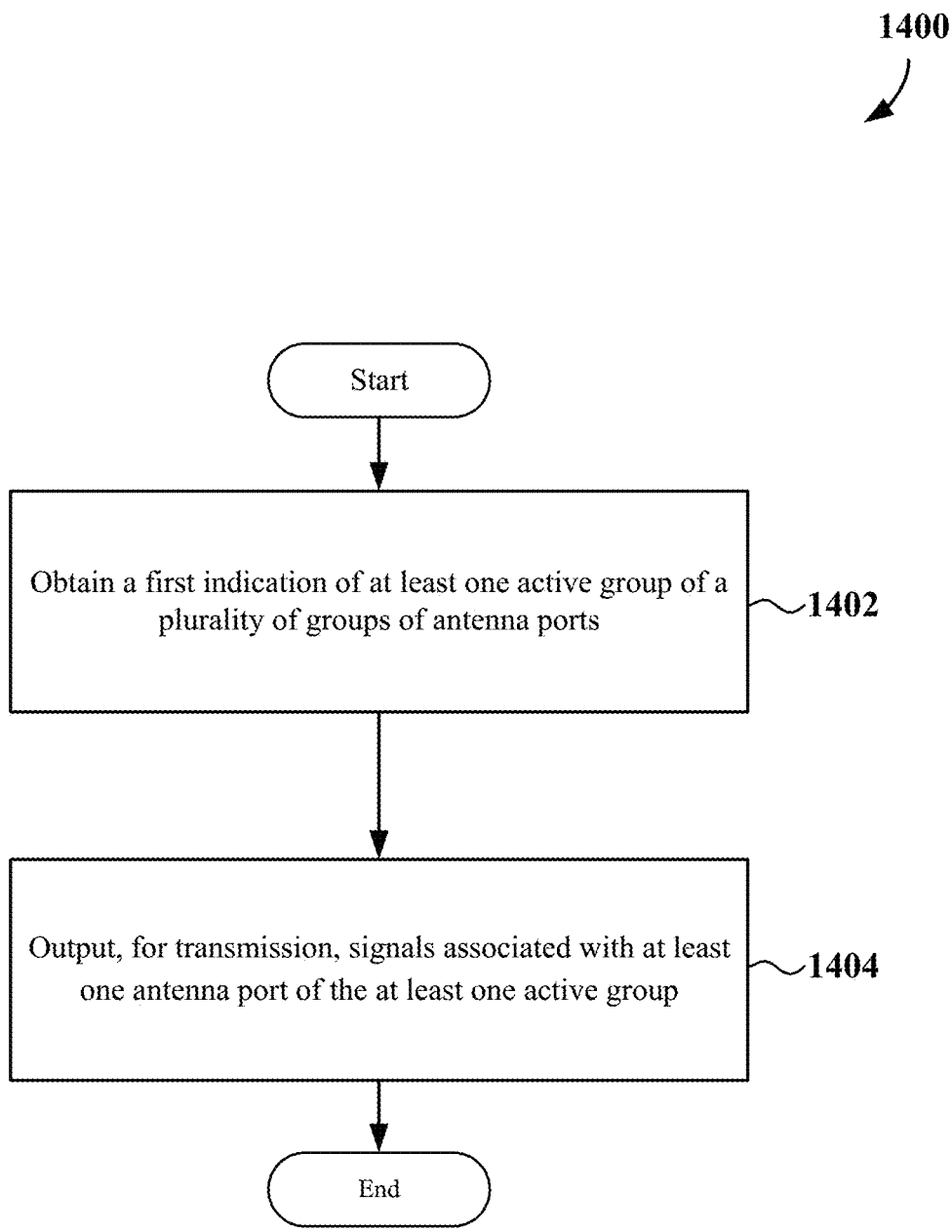
FIG. 14 is a flow chart illustrating an example wireless communication method relating to obtaining an indication of at least one active group of antenna ports according to some aspects.

FIG. 14 is a flow chart illustrating an example method 1400 for an apparatus in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the apparatus 1300 illustrated in FIG. 13. In some examples, the method 1400 may be carried out by any suitable apparatus or means for carrying out the functions or algorithm described below.

At block 1402, an apparatus may obtain a first indication of at least one active group of a plurality of groups of antenna ports. In some examples, the antenna group configuration circuitry 1342, shown and described in FIG. 13, may provide a means to obtain a first indication of at least one active group of a plurality of groups of antenna ports. In some examples, the antenna group configuration circuitry 1342 in cooperation with the communication and processing circuitry 1341 and the transceiver 1310, shown and described in FIG. 13, may provide a means to obtain a first indication of at least one active group of a plurality of groups of antenna ports.

At block 1404, the apparatus may output, for transmission, signals associated with at least one antenna port of the at least one active group. In some examples, the communication and processing circuitry 1341 and the transceiver 1310, shown and described in FIG. 13, may provide a means to output, for transmission, signals associated with at least one antenna port of the at least one active group. In some examples, the antenna group configuration circuitry 1342 may provide a means to output, for transmission, signals associated with at least one antenna port of the at least one active group. In some examples, the antenna group configuration circuitry 1342 in cooperation with the communication and processing circuitry 1341 and the transceiver 1310, shown and described in FIG. 13, may provide a means to output, for transmission, signals associated with at least one antenna port of the at least one active group.

In some examples, the apparatus may obtain at least one second indication of at least one precoder for the at least one active group. In some examples, the apparatus may obtain at least one transmit precoding matrix indicator for the at least one active group.

In some examples, the at least one active group may include a first active group and a second active group. In some examples, the at least one transmit precoding matrix indicator may include a first transmit precoding matrix indicator for the first active group and a second transmit precoding matrix indicator for the second active group. In some examples, the first transmit precoding matrix indicator is different from the second transmit precoding matrix indicator. In some examples, the at least one transmit precoding matrix indicator may include a single transmit precoding matrix indicator for the first active group and the second active group.

In some examples, the at least one active group may further include a third active group. In some examples, the at least one transmit precoding matrix indicator may include a first transmit precoding matrix indicator for the first active group, a second transmit precoding matrix indicator for the second active group, and a third transmit precoding matrix indicator for the third active group. In some examples, the first transmit precoding matrix indicator is different from the third transmit precoding matrix indicator. In some examples, the at least one transmit precoding matrix indicator may include a single transmit precoding matrix indicator for the first active group, the second active group, and the third active group.

In some examples, the apparatus may output, for transmission, a second indication of particular groups of the plurality of groups of antenna ports that are supported by the apparatus. In some examples, the apparatus may output, for transmission, a third indication of at least one respective antenna port in each particular group supported by the apparatus.

In some examples, first antenna ports of a first group of the plurality of groups of antenna ports are mutually coherent, second antenna ports of a second group of the plurality of groups of antenna ports are mutually coherent, and the first antenna ports are not coherent with respect to the second antenna ports. In some examples, third antenna ports of a third group of the plurality of groups of antenna ports are mutually coherent, and the third antenna ports are not coherent with respect to the first antenna ports and the second antenna ports.

In some examples, the plurality of groups of antenna ports may include two groups of antenna ports, three groups of antenna ports, or four groups of antenna ports. In some examples, the plurality of groups of antenna ports includes eight antenna ports.

In some examples, a first group of the plurality of groups of antenna ports is associated with a first antenna port and a second antenna port, a second group of the plurality of groups of antenna ports is associated with a third antenna port and a fourth antenna port, a third group of the plurality of groups of antenna ports is associated with a fifth antenna port and a sixth antenna port, and a fourth group of the plurality of groups of antenna ports is associated with a seventh antenna port and an eighth antenna port.

In some examples, a first group of the plurality of groups of antenna ports is associated with a first antenna port and a second antenna port, a second group of the plurality of groups of antenna ports is associated with a third antenna port and a fourth antenna port, and a third group of the plurality of groups of antenna ports is associated with a fifth antenna port, a sixth antenna port, a seventh antenna port, and an eighth antenna port.

In some examples, a first group of the plurality of groups of antenna ports is associated with a first antenna port and a second antenna port, and a second group of the plurality of groups of antenna ports is associated with a third antenna port, a fourth antenna port, a fifth antenna port, a sixth antenna port, a seventh antenna port, and an eighth antenna port.

In some examples, a first group of the plurality of groups of antenna ports is associated with a first antenna port, a second antenna port, a third antenna port and a fourth antenna port, and a second group of the plurality of groups of antenna ports is associated with a fifth antenna port, a sixth antenna port, a seventh antenna port, and an eighth antenna port.

In some examples, the apparatus may include a receiver configured to receive the first indication of at least one active group. In some examples, the apparatus may include a transmitter configured to transmit the signals via the at least one antenna port. In some examples, the apparatus may be configured as a user equipment or a network entity.

In one configuration, the apparatus 1300 includes means for obtaining a first indication of at least one active group of a plurality of groups of antenna ports, and means for outputting, for transmission, signals associated with at least one antenna port of the at least one active group. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 4, 5, 6, 12, and 13, and utilizing, for example, the methods and/or algorithms described herein in relation to FIG. 14.

Figure 15:
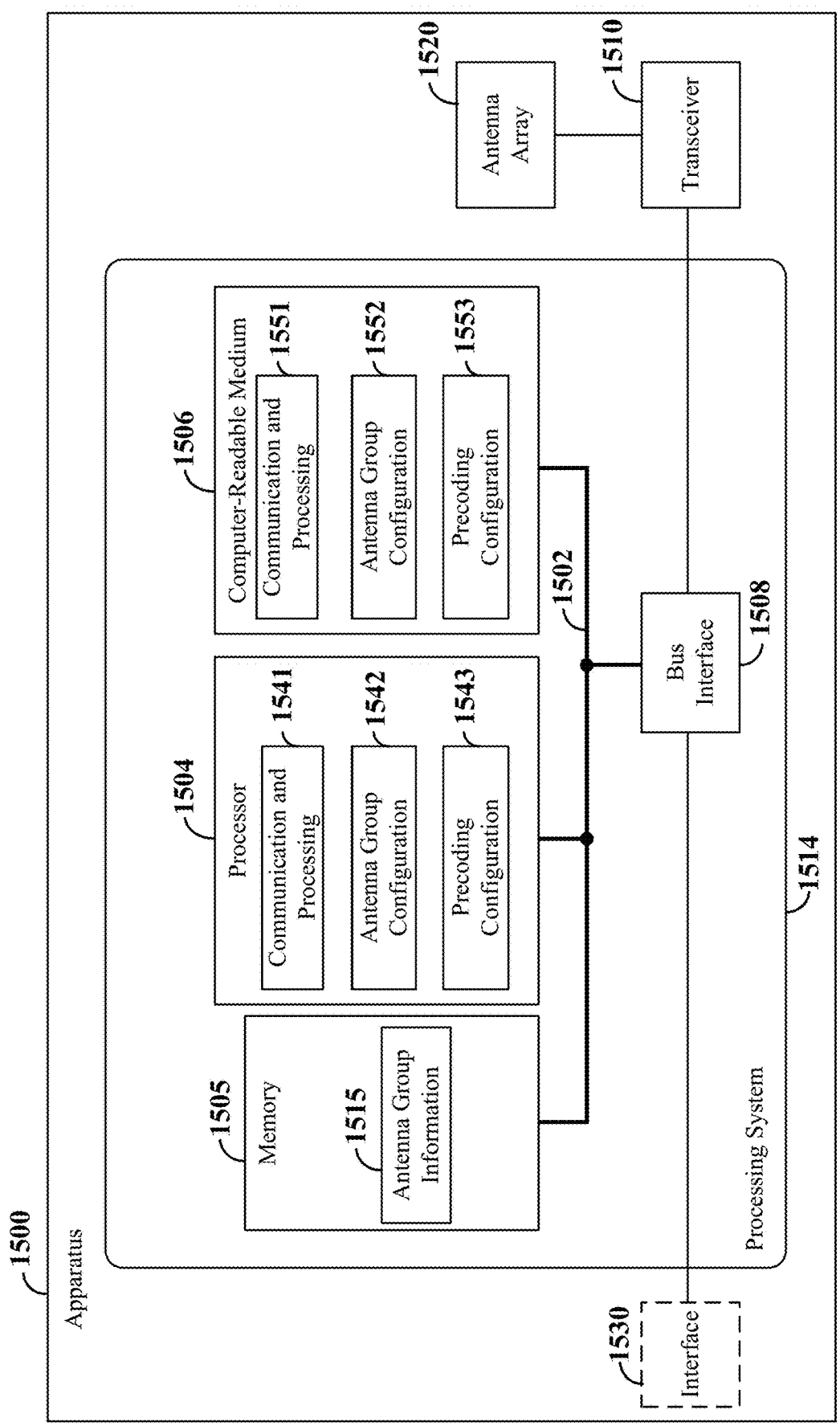
FIG. 15 is a block diagram conceptually illustrating an example of a hardware implementation for an apparatus (e.g., a scheduling entity) employing a processing system according to some aspects.

FIG. 15 is a conceptual diagram illustrating an example of a hardware implementation for an apparatus 1500 employing a processing system 1514. In some implementations, the apparatus 1500 may correspond to any of the network entities, base stations (e.g., gNBs), CUs, DUs, RUs, or scheduling entities shown in any of FIGS. 1, 2, 4, 5, 6, and 12.

In accordance with various aspects of the disclosure, an element, or any portion of an element, or any combination of elements may be implemented with the processing system 1514. The processing system may include one or more processors 1504. The processing system 1514 may be substantially the same as the processing system 1314 illustrated in FIG. 13, including a bus interface 1508, a bus 1502, memory 1505, a processor 1504, a computer-readable medium 1506, a transceiver 1510, and an antenna array 1520. The memory 1505 may store antenna group information 1515 (e.g., active group information and associated TPMIs) used by the processor 1504 in cooperation with the transceiver 1510 for the antenna port-related operations described herein. Furthermore, the apparatus 1500 may include an interface 1530 (e.g., a network interface) that provides a means for communicating with at least one other apparatus within a core network and with at least one radio access network.

The apparatus 1500 may be configured to perform any one or more of the operations described herein (e.g., as described above in conjunction with FIGS. 1-12 and as described below in conjunction with FIG. 16). In some aspects of the disclosure, the processor 1504, as utilized in the apparatus 1500, may include circuitry configured for various functions.

The processor 1504 may be configured to generate, schedule, and modify a resource assignment or grant of time-frequency resources (e.g., a set of one or more resource elements). For example, the processor 1504 may schedule time—frequency resources within a plurality of time division duplex (TDD) and/or frequency division duplex (FDD) subframes, slots, and/or mini-slots to carry user data traffic and/or control information to and/or from multiple scheduled entities. The processor 1504 may be configured to schedule resources for the transmission of downlink signals. The processor 1504 may further be configured to schedule resources for the transmission of uplink signals.

In some aspects of the disclosure, the processor 1504 may include communication and processing circuitry 1541. The communication and processing circuitry 1541 may be configured to communicate with a scheduled entity. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

The communication and processing circuitry 1541 may further be configured to receive a message from a UE. For example, the message may be included in a MAC-CE carried in a Uu PUSCH or a PSCCH, or included in a Uu RRC message or an SL RRC message, or included in a dedicated Uu PUCCH or PUSCH. The communication and processing circuitry 1541 may further be configured to receive a scheduling request from a UE for an uplink grant or a sidelink grant.

In some implementations wherein the communication involves obtaining (e.g., receiving) information, the communication and processing circuitry 1541 may obtain information from a component of the apparatus 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for obtaining (e.g., obtaining indications, signals, or other information from another apparatus). In some examples, the communication and processing circuitry 1541 may include functionality for a means for receiving (e.g., receiving signals from another apparatus). In some examples, the communication and processing circuitry 1541 may include functionality for a means for decoding. In some examples, the communication and processing circuitry 1541 may include functionality for a means for obtaining signals associated with at least one antenna port of at least one active antenna port group (e.g., as described above in conjunction with FIGS. 7-12). For example, the communication and processing circuitry 1541 may be configured to receive signals transmitted by another apparatus on different layers and/or on different beams.

In some implementations wherein the communication involves outputting (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., a means for transmitting). In some examples, the communication and processing circuitry 1541 may include functionality for a means for encoding. In some examples, the communication and processing circuitry 1541 may include functionality for a means for outputting (e.g., outputting indications, signals, TMPIs, or other information to another apparatus). In some examples, the communication and processing circuitry 1541 may include functionality for a means for transmitting (e.g., transmitting indications, signals, TMPIs, or other information to another apparatus). In some examples, the communication and processing circuitry 1541 may include functionality for a means for outputting, for transmission, signals for at least one antenna port of at least one active antenna port group (e.g., as described above in conjunction with FIGS. 7-12). For example, the communication and processing circuitry 1541 may be configured to transmit signals for a first antenna port via a first antenna, transmit signals for a second antenna port via a second antenna, etc.

The processor 1504 may include antenna group configuration circuitry 1542 configured to perform antenna group configuration-related operations as discussed herein (e.g., one or more of the operations described above in conjunction with FIGS. 7-12). The antenna group configuration circuitry 1542 may be configured to execute antenna group configuration software 1552 included on the computer-readable medium 1506 to implement one or more functions described herein.

The antenna group configuration circuitry 1542 may include functionality for a means for outputting, for transmission, an indication of at least one active group of a plurality of groups of antenna ports (e.g., as described above in conjunction with FIGS. 7-12). For example, the antenna group configuration circuitry 1542 may identify at least one active group. In addition, the antenna group configuration circuitry 1542 may generate a DCI that includes a corresponding active group indicator.

The antenna group configuration circuitry 1542 may include functionality for a means for obtaining an indication of particular groups of a plurality of groups of antenna ports that are supported by the second apparatus (e.g., as described above in conjunction with FIGS. 7-12). For example, the antenna group configuration circuitry 1542 may monitor a scheduled channel (e.g., a PUSCH, a PUCCH etc.) for capability information including the indication transmitted by another apparatus (e.g., a UE).

The antenna group configuration circuitry 1542 may include functionality for a means for obtaining an indication of at least one respective antenna port in each particular group supported by the second apparatus (e.g., as described above in conjunction with FIGS. 7-12). For example, the antenna group configuration circuitry 1542 may monitor a scheduled channel (e.g., a PUSCH, a PUCCH etc.) for capability information including the indication transmitted by another apparatus (e.g., a UE).

The antenna group configuration circuitry 1542 may include functionality for a means for selecting at least one active group (e.g., as described above in conjunction with FIGS. 7-12). For example, the antenna group configuration circuitry 1542 may select the at least one active group based on an indication included in capability information received from another apparatus (e.g. a UE).

The antenna group configuration circuitry 1542 may include functionality for a means for obtaining signals that are associated with at least one antenna port (e.g., as described above in conjunction with FIGS. 7-12). For example, the antenna group configuration circuitry 1542 may monitor a scheduled channel (e.g., a PUSCH, etc.) for signals transmitted by another apparatus on different layers and/or different beams.

The processor 1504 may include precoding configuration circuitry 1543 configured to perform precoding configuration-related operations as discussed herein (e.g., one or more of the operations described above in conjunction with FIGS. 7-12). The precoding configuration circuitry 1543 may be configured to execute precoding configuration software 1553 included on the computer-readable medium 1506 to implement one or more functions described herein.

The precoding configuration circuitry 1543 may include functionality for a means for outputting at least one TPMI associated with at least one active group of a plurality of groups of antenna ports (e.g., as described above in conjunction with FIGS. 7-12). For example, the antenna group configuration circuitry 1542 may determine the TPMI(s) associated with the at least one active group based on the requirements of a scheduled transmission and/or a predefined mapping of TPMIs to active groups. In addition, the antenna group configuration circuitry 1542 may generate a DCI that includes at least one TPMI index.

Figure 16:
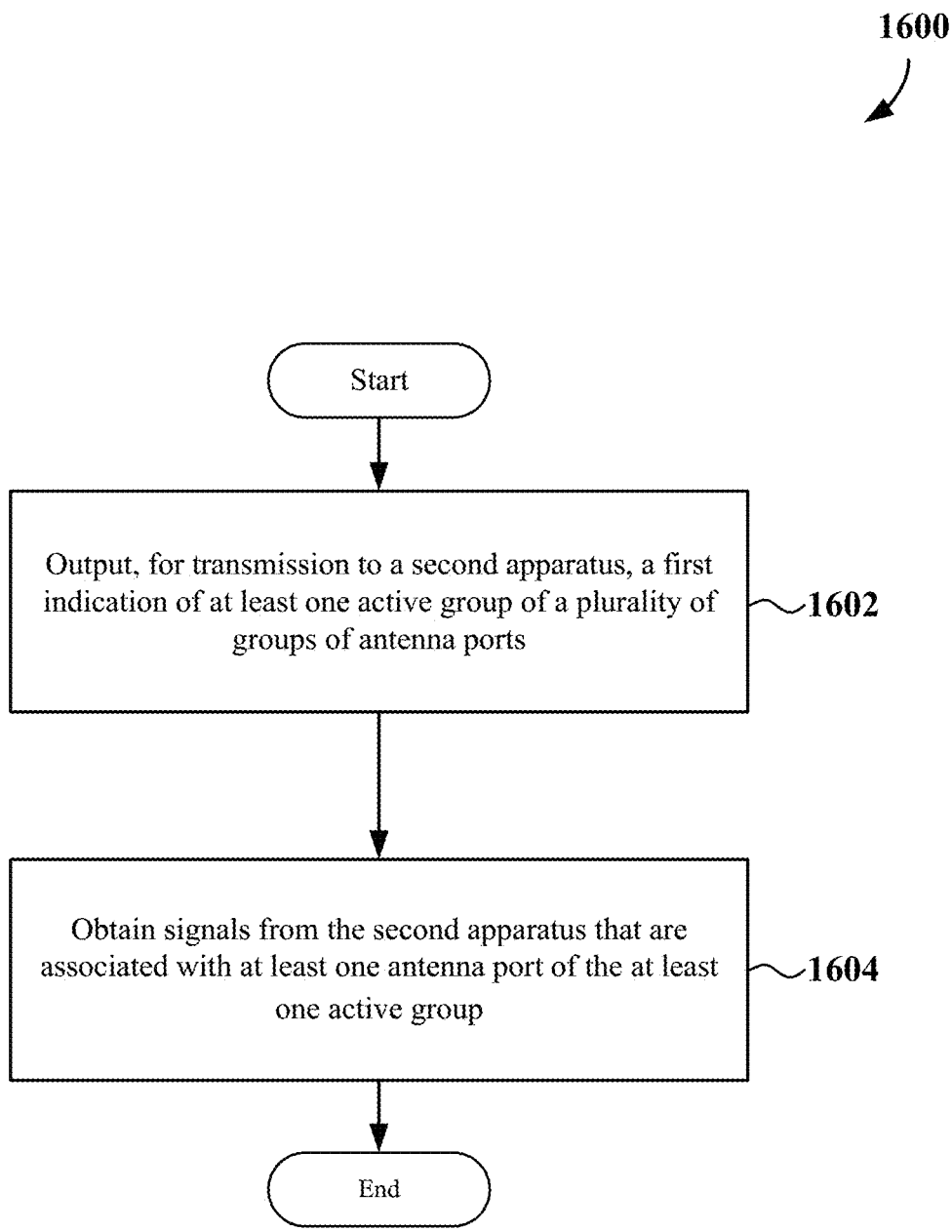
FIG. 16 is a flow chart illustrating an example wireless communication method relating to providing an indication of at least one active group of antenna ports according to some aspects.

FIG. 16 is a flow chart illustrating an example method 1600 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the apparatus 1500 illustrated in FIG. 15. In some examples, the method 1600 may be carried out by any suitable apparatus or means for carrying out the functions or algorithm described below.

At block 1602, a first apparatus may output, for transmission to a second apparatus, a first indication of at least one active group of a plurality of groups of antenna ports. In some examples, the antenna group configuration circuitry 1542, shown and described in FIG. 15, may provide a means to output, for transmission to a second apparatus, a first indication of at least one active group of a plurality of groups of antenna ports. In some examples, the antenna group configuration circuitry 1542 in cooperation with the communication and processing circuitry 1541 and the transceiver 1510, shown and described in FIG. 15, may provide a means to output, for transmission to a second apparatus, a first indication of at least one active group of a plurality of groups of antenna ports.

At block 1604, the first apparatus may obtain signals from the second apparatus that are associated with at least one antenna port of the at least one active group. In some examples, the antenna group configuration circuitry 1542, shown and described in FIG. 15, may provide a means to obtain signals from the second apparatus for at least one antenna port of the at least one active group. In some examples, the communication and processing circuitry 1541 and the transceiver 1510, shown and described in FIG. 15, may provide a means to obtain signals from the second apparatus that are associated with at least one antenna port of the at least one active group.

In some examples, the first apparatus may output, for transmission, at least one transmit precoding matrix indicator for the at least one active group.

In some examples, the first apparatus may obtain a second indication of particular groups of the plurality of groups of antenna ports that are supported by the second apparatus. In some examples, the first apparatus may select the at least one active group based on the second indication.

In some examples, the first apparatus may obtain a third indication of at least one respective antenna port in each particular group supported by the second apparatus. In some examples, the first apparatus may select the at least one active group based on the third indication.

In some examples, the at least one active group may include a first active group and a second active group. In some examples, the at least one transmit precoding matrix indicator may include a first transmit precoding matrix indicator for the first active group and a second transmit precoding matrix indicator for the second active group. In some examples, the first transmit precoding matrix indicator is different from the second transmit precoding matrix indicator. In some examples, the at least one transmit precoding matrix indicator may include a single transmit precoding matrix indicator for the first active group and the second active group.

In some examples, the at least one active group may further include a third active group. In some examples, the at least one transmit precoding matrix indicator may include a first transmit precoding matrix indicator for the first active group, a second transmit precoding matrix indicator for the second active group, and a third transmit precoding matrix indicator for the third active group. In some examples, the first transmit precoding matrix indicator is different from the third transmit precoding matrix indicator. In some examples, the at least one transmit precoding matrix indicator may include a single transmit precoding matrix indicator for the first active group, the second active group, and the third active group.

In some examples, first antenna ports of a first group of the plurality of groups of antenna ports are mutually coherent, second antenna ports of a second group of the plurality of groups of antenna ports are mutually coherent, and the first antenna ports are not coherent with respect to the second antenna ports. In some examples, third antenna ports of a third group of the plurality of groups of antenna ports are mutually coherent, and the third antenna ports are not coherent with respect to the first antenna ports and the second antenna ports.

In some examples, the plurality of groups of antenna ports may include two groups of antenna ports, three groups of antenna ports, or four groups of antenna ports. In some examples, the plurality of groups of antenna ports includes eight antenna ports.

In some examples, a first group of the plurality of groups of antenna ports is associated with a first antenna port and a second antenna port, a second group of the plurality of groups of antenna ports is associated with a third antenna port and a fourth antenna port, a third group of the plurality of groups of antenna ports is associated with a fifth antenna port and a sixth antenna port, and a fourth group of the plurality of groups of antenna ports is associated with a seventh antenna port and an eighth antenna port.

In some examples, a first group of the plurality of groups of antenna ports is associated with a first antenna port and a second antenna port, a second group of the plurality of groups of antenna ports is associated with a third antenna port and a fourth antenna port, and a third group of the plurality of groups of antenna ports is associated with a fifth antenna port, a sixth antenna port, a seventh antenna port, and an eighth antenna port.

In some examples, a first group of the plurality of groups of antenna ports is associated with a first antenna port and a second antenna port, and a second group of the plurality of groups of antenna ports is associated with a third antenna port, a fourth antenna port, a fifth antenna port, a sixth antenna port, a seventh antenna port, and an eighth antenna port.

In some examples, a first group of the plurality of groups of antenna ports is associated with a first antenna port, a second antenna port, a third antenna port and a fourth antenna port, and a second group of the plurality of groups of antenna ports is associated with a fifth antenna port, a sixth antenna port, a seventh antenna port, and an eighth antenna port.

In some examples, the first apparatus may include a transmitter configured to transmit the first indication of at least one active group. In some examples, the apparatus may include a receiver configured to receive the signals from the second apparatus. In some examples, the first apparatus may be configured as a network entity.

In one configuration, the apparatus 1500 includes means for outputting, for transmission to a second apparatus, a first indication of at least one active group of a plurality of groups of antenna ports, and means for obtaining signals from the second apparatus that are associated with at least one antenna port of the at least one active group. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS. 1, 2, 4, 5, 6, 12, and 15, and utilizing, for example, the methods and/or algorithms described herein in relation to FIG. 16.

The methods shown in FIGS. 14 and 16 may include additional aspects, such as any single aspect or any combination of aspects described below and/or in connection with one or more other processes described elsewhere herein. The following provides an overview of several aspects of the present disclosure.

Aspect 1: A method for wireless communication at an apparatus, the method comprising: obtaining a first indication of at least one active group of a plurality of groups of antenna ports, and outputting, for transmission, signals associated with at least one antenna port of the at least one active group.

Aspect 2: The method of aspect 1, further comprising: obtaining at least one second indication of at least one precoder for the at least one active group.

Aspect 3: The method of aspect 2, further comprising: obtaining at least one transmit precoding matrix indicator for the at least one active group.

Aspect 4: The method of aspect 3, wherein the at least one transmit precoding matrix indicator comprises a first transmit precoding matrix indicator for a first active group of the at least one active group and a second transmit precoding matrix indicator for a second active group of the at least one active group.

Aspect 5: The method of aspect 4, wherein the first transmit precoding matrix indicator is different from the second transmit precoding matrix indicator.

Aspect 6: The method of aspect 3, wherein the at least one transmit precoding matrix indicator comprises a single transmit precoding matrix indicator for a first active group of the at least one active group and a second active group of the at least one active group.

Aspect 7: The method of aspect 3, wherein the at least one transmit precoding matrix indicator comprises a first transmit precoding matrix indicator for a first active group of the at least one active group, a second transmit precoding matrix indicator for a second active group of the at least one active group, and a third transmit precoding matrix indicator for a third active group of the at least one active group.

Aspect 8: The method of aspect 7, wherein the first transmit precoding matrix indicator is different from the third transmit precoding matrix indicator.

Aspect 9: The method of aspect 3, wherein the at least one transmit precoding matrix indicator comprises a single transmit precoding matrix indicator for a first active group of the at least one active group, a second active group of the at least one active group, and a third active group of the at least one active group.

Aspect 10: The method of any of aspects 1 through 9, further comprising: outputting, for transmission, a second indication of particular groups of the plurality of groups of antenna ports that are supported by the apparatus.

Aspect 11: The method of any of aspects 1 through 10, further comprising: outputting, for transmission, a third indication of at least one respective antenna port in each of the particular groups supported by the apparatus.

Aspect 12: The method of any of aspects 1 through 11, wherein: first antenna ports of a first group of the plurality of groups of antenna ports are mutually coherent; second antenna ports of a second group of the plurality of groups of antenna ports are mutually coherent; and the first antenna ports are not coherent with respect to the second antenna ports.

Aspect 13: The method of aspect 12, wherein: third antenna ports of a third group of the plurality of groups of antenna ports are mutually coherent; and the third antenna ports are not coherent with respect to the first antenna ports and the second antenna ports.

Aspect 14: The method of any of aspects 1 through 11, wherein the plurality of groups of antenna ports comprises two groups of antenna ports, three groups of antenna ports, or four groups of antenna ports.

Aspect 15: The method of any of aspects 1 through 14, wherein the plurality of groups of antenna ports comprises eight antenna ports.

Aspect 16: The method of any of aspects 1 through 11, wherein: a first group of the plurality of groups of antenna ports is associated with a first antenna port and a second antenna port; a second group of the plurality of groups of antenna ports is associated with a third antenna port and a fourth antenna port; a third group of the plurality of groups of antenna ports is associated with a fifth antenna port and a sixth antenna port; and a fourth group of the plurality of groups of antenna ports is associated with a seventh antenna port and an eighth antenna port.

Aspect 17: The method of any of aspects 1 through 11, wherein: a first group of the plurality of groups of antenna ports is associated with a first antenna port and a second antenna port; a second group of the plurality of groups of antenna ports is associated with a third antenna port and a fourth antenna port; and a third group of the plurality of groups of antenna ports is associated with a fifth antenna port, a sixth antenna port, a seventh antenna port, and an eighth antenna port.

Aspect 18: The method of any of aspects 1 through 11, wherein: a first group of the plurality of groups of antenna ports is associated with a first antenna port and a second antenna port; and a second group of the plurality of groups of antenna ports is associated with a third antenna port, a fourth antenna port, a fifth antenna port, a sixth antenna port, a seventh antenna port, and an eighth antenna port.

Aspect 19: The method of any of aspects 1 through 11, wherein: a first group of the plurality of groups of antenna ports is associated with a first antenna port, a second antenna port, a third antenna port and a fourth antenna port; and a second group of the plurality of groups of antenna ports is associated with a fifth antenna port, a sixth antenna port, a seventh antenna port, and an eighth antenna port.

Aspect 20: The method of any of aspects 1 through 19, further comprising: receiving the first indication of at least one active group; and transmitting the signals via the at least one antenna port, wherein the apparatus is configured as a user equipment or a network entity.

Aspect 22: A method for wireless communication at a first apparatus, the method comprising: outputting, for transmission to a second apparatus, a first indication of at least one active group of a plurality of groups of antenna ports, and obtaining signals from the second apparatus that are associated with at least one antenna port of the at least one active group.

Aspect 23: The method of aspect 22, further comprising: outputting, for transmission, at least one transmit precoding matrix indicator for the at least one active group.

Aspect 24: The method of any of aspects 22 through 23, further comprising: obtaining a second indication of particular groups of the plurality of groups of antenna ports that are supported by the second apparatus.

Aspect 25: The method of aspect 24, further comprising: selecting the at least one active group based on the second indication.

Aspect 26: The method of any of aspects 24 through 25, further comprising: obtaining a third indication of at least one respective antenna port in each particular group supported by the second apparatus.

Aspect 27: The method of aspect 26, further comprising: selecting the at least one active group based on the third indication.

Aspect 28: The method of any of aspects 22 through 27, wherein the plurality of groups of antenna ports comprises eight antenna ports.

Aspect 29: The method of any of aspects 22 through 28, further comprising: transmitting the first indication of at least one active group; and receiving the signals from the second apparatus, wherein the first apparatus is configured as a network entity.

Aspect 30: A user equipment or network entity, comprising: at least one transceiver; a memory comprising instructions; and one or more processors configured to execute the instructions and cause the user equipment or network entity to perform a method in accordance with any one or more of aspects 1-19, wherein the at least one transceiver is configured to receive the first indication of at least one active group and transmit the signals via the at least one antenna port.

Aspect 31: An apparatus configured for communication comprising at least one means for performing any one or more of aspects 1 through 20.

Aspect 32: A non-transitory computer-readable medium storing computer-executable code, comprising code for causing an apparatus to perform any one or more of aspects 1 through 20.

Aspect 33: A network entity, comprising: at least one transceiver; a memory comprising instructions; and one or more processors configured to execute the instructions and cause the wireless device to perform a method in accordance with any one or more of aspects 22-28, wherein the at least one transceiver is configured to r transmit the first indication of at least one active group and receive the signals from the second apparatus.

Aspect 34: A first apparatus configured for communication comprising at least one means for performing any one or more of aspects 22 through 29.

Aspect 35: A non-transitory computer-readable medium storing computer-executable code, comprising code for causing a first apparatus to perform any one or more of aspects 22 through 29.

Aspect 36: An apparatus, comprising: a memory comprising instructions; and one or more processors configured to execute the instructions and cause the apparatus to perform a method in accordance with any one or more of aspects 1-19.

Aspect 37: A first apparatus, comprising: a memory comprising instructions; and one or more processors configured to execute the instructions and cause the first apparatus to perform a method in accordance with any one or more of aspects 22-28.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects.

For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 6, 12, 13, and 15 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for communication, comprising:
an interface; and
a processing system configured to:
   obtain, via the interface, a first indication of at least one active group of a plurality of groups of antenna ports;
   obtain, via the interface, at least one transmit precoding matrix indicator for the at least one active group, wherein the at least one transmit precoding matrix indicator comprises a single transmit precoding matrix indicator for a first active group of the at least one active group, a second active group of the at least one active group, and a third active group of the at least one active group; and
   output, via the interface for transmission, signals associated with at least one antenna port of the at least one active group.

2. The apparatus of claim 1, wherein the processing system is further configured to:
   obtain, via the interface, at least one second indication of at least one precoder for the at least one active group.

3. The apparatus of claim 1, wherein the at least one transmit precoding matrix indicator comprises a first transmit precoding matrix indicator for a first active group of the at least one active group and a second transmit precoding matrix indicator for a second active group of the at least one active group.

4. The apparatus of claim 3, wherein the first transmit precoding matrix indicator is different from the second transmit precoding matrix indicator.

5. The apparatus of claim 1, wherein the at least one transmit precoding matrix indicator comprises a single transmit precoding matrix indicator for a first active group of the at least one active group and a second active group of the at least one active group.

6. The apparatus of claim 1, wherein the at least one transmit precoding matrix indicator comprises a first transmit precoding matrix indicator for a first active group of the at least one active group, a second transmit precoding matrix indicator for a second active group of the at least one active group, and a third transmit precoding matrix indicator for a third active group of the at least one active group.

7. The apparatus of claim 6, wherein the first transmit precoding matrix indicator is different from the third transmit precoding matrix indicator.

8. The apparatus of claim 1, wherein the processing system is further configured to:
   output, via the interface for transmission, a second indication of particular groups of the plurality of groups of antenna ports that are supported by the apparatus.

9. The apparatus of claim 8, wherein the processing system is further configured to:
   output, via the interface for transmission, a third indication of at least one respective antenna port in each of the particular groups supported by the apparatus.

10. The apparatus of claim 1, wherein:
first antenna ports of a first group of the plurality of groups of antenna ports are mutually coherent;
second antenna ports of a second group of the plurality of groups of antenna ports are mutually coherent; and
the first antenna ports are not coherent with respect to the second antenna ports.

11. The apparatus of claim 10, wherein:
third antenna ports of a third group of the plurality of groups of antenna ports are mutually coherent; and
the third antenna ports are not coherent with respect to the first antenna ports and the second antenna ports.

12. The apparatus of claim 1, wherein the plurality of groups of antenna ports comprises two groups of antenna ports, three groups of antenna ports, or four groups of antenna ports.

13. The apparatus of claim 1, wherein the plurality of groups of antenna ports comprises eight antenna ports.

14. The apparatus of claim 1, wherein:
a first group of the plurality of groups of antenna ports is associated with a first antenna port and a second antenna port;
a second group of the plurality of groups of antenna ports is associated with a third antenna port and a fourth antenna port;
a third group of the plurality of groups of antenna ports is associated with a fifth antenna port and a sixth antenna port; and
a fourth group of the plurality of groups of antenna ports is associated with a seventh antenna port and an eighth antenna port.

15. The apparatus of claim 1, wherein:
a first group of the plurality of groups of antenna ports is associated with a first antenna port and a second antenna port;
a second group of the plurality of groups of antenna ports is associated with a third antenna port and a fourth antenna port; and
a third group of the plurality of groups of antenna ports is associated with a fifth antenna port, a sixth antenna port, a seventh antenna port, and an eighth antenna port.

16. The apparatus of claim 1, wherein:
a first group of the plurality of groups of antenna ports is associated with a first antenna port and a second antenna port; and
a second group of the plurality of groups of antenna ports is associated with a third antenna port, a fourth antenna port, a fifth antenna port, a sixth antenna port, a seventh antenna port, and an eighth antenna port.

17. The apparatus of claim 1, wherein:
a first group of the plurality of groups of antenna ports is associated with a first antenna port, a second antenna port, a third antenna port and a fourth antenna port; and
a second group of the plurality of groups of antenna ports is associated with a fifth antenna port, a sixth antenna port, a seventh antenna port, and an eighth antenna port.

18. The apparatus of claim 1, further comprising:
a receiver configured to receive the first indication of at least one active group; and
a transmitter configured to transmit the signals via the at least one antenna port,
wherein the apparatus is configured as a user equipment or a network entity.

19. A method for communication at an apparatus, the method comprising:
obtaining a first indication of at least one active group of a plurality of groups of antenna ports;
obtaining at least one transmit precoding matrix indicator for the at least one active group, wherein the at least one transmit precoding matrix indicator comprises a single transmit precoding matrix indicator for a first active group of the at least one active group, a second active group of the at least one active group, and a third active group of the at least one active group; and
outputting, for transmission, signals associated with at least one antenna port of the at least one active group.

20. A first apparatus for communication, comprising:
an interface; and
a processing system configured to:
output, via the interface for transmission to a second apparatus, a first indication of at least one active group of a plurality of groups of antenna ports;
obtain, via the interface, signals from the second apparatus that are associated with at least one antenna port of the at least one active group;
obtain, via the interface, a second indication of particular groups of the plurality of groups of antenna ports that are supported by the second apparatus; and
obtain, via the interface, a third indication of at least one respective antenna port in each particular group supported by the second apparatus.

21. The first apparatus of claim 20, wherein the processing system is further configured to:
output, via the interface for transmission, at least one transmit precoding matrix indicator for the at least one active group.

22. The first apparatus of claim 20, wherein the processing system is further configured to:
select the at least one active group based on the second indication.

23. The first apparatus of claim 20, wherein the processing system is further configured to:
select the at least one active group based on the third indication.

24. The first apparatus of claim 20, wherein the plurality of groups of antenna ports comprises eight antenna ports.

25. The first apparatus of claim 20, further comprising:
a transmitter configured to transmit the first indication of at least one active group; and
a receiver configured to receive the signals from the second apparatus,
wherein the first apparatus is configured as a network entity.

* * * * *